(12) United States Patent
Hinderks

(10) Patent No.: US 6,373,927 B1
(45) Date of Patent: *Apr. 16, 2002

(54) METHOD AND APPARATUS FOR TRANSMITTING CODED AUDIO SIGNALS THROUGH A TRANSMISSION CHANNEL WITH LIMITED BANDWIDTH

(75) Inventor: Larry Hinderks, Holmdel, NJ (US)

(73) Assignee: Corporate Computer Systems, Holmdel, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/595,521

(22) Filed: Jun. 16, 2000

Related U.S. Application Data

(63) Continuation of application No. 08/988,709, filed on Dec. 11, 1997, which is a continuation of application No. 08/419,199, filed on Apr. 10, 1995, now Pat. No. 5,706,335.

(51) Int. Cl.⁷ .............................................. H04M 11/00
(52) U.S. Cl. .................. 379/93.31; 379/93.08
(58) Field of Search .............................. 379/93.31, 399, 379/93.28, 93.01, 93.05, 93.08, 419; 375/222

(56) References Cited

U.S. PATENT DOCUMENTS

| | | | | |
|---|---|---|---|---|
| 4,972,484 | A | 11/1990 | Theile et al. ................. | 381/37 |
| 5,325,423 | A | 6/1994 | Lewis .......................... | 379/90 |
| 5,389,965 | A | 2/1995 | Kuzman ..................... | 348/14 |
| 5,706,335 | A | 1/1998 | Hinderks .................... | 379/93 |
| 6,128,374 | A | * 10/2000 | Hinderks ................. | 379/93.31 |

FOREIGN PATENT DOCUMENTS

| | | | | |
|---|---|---|---|---|
| EP | 0 372 601 A1 | 6/1990 | ............ | H04B/1/66 |

OTHER PUBLICATIONS

Matsumoto et al., "120/140 Mbit/s portable HDTV codec and its transmission performance in a field trial via INTELSAT Satellite," Aug. 1, 1992, pp. 359–377, Signal Processing Image Communiction, Elsevier Science Publishers, vol. 4, No. 4/5.

Le Gall, "MPEG: A Video Compression Standard for Multimedia Applications," Apr. 1, 1991, pp. 46–58, Communications of the Association for Computing Machinery, vol. 34, No. 4, New York.

CDQ1000 Reference Manual, Revision 3.3, dated May 1994.

CDQ2000 Reference Manual, Revision 6.92–2, dated Jul. 27, 1994.

CDQ2001 Reference Manual, Revision 2.2–3, dated Aug., 1994.

ISO–MPEG–1 Audio: A Generic Standard for Coding of Hig–Quality Digital Audio, Karlheinz Bradenburg and Gerhard Stoll. *Journal of Audio Eng. Soc.*, 42(10) :780–792 (Oct. 1994).

* cited by examiner

*Primary Examiner*—Stella Woo
(74) *Attorney, Agent, or Firm*—McAndrews, Held & Malloy, Ltd.; Robert C. Ryan

(57) ABSTRACT

A digital audio transmitter system capable of transmitting high quality, wideband speech over a transmission channel with a limited bandwidth such as a traditional telephone line. The digital audio transmitter system includes a coder for coding an input audio signal to a digital signal having a transmission rate that does not exceed the maximum allowable transmission rate for traditional telephone lines and a decoder for decoding the digital signal to provide an output audio signal with an audio bandwidth of wideband speech. A coder and a decoder may be provided in a single device to allow two-way communication between multiple devices.

16 Claims, 27 Drawing Sheets

CONTROL PROCESSOR

CONTROL PROCESSOR MEMORY

ENCODER DSP

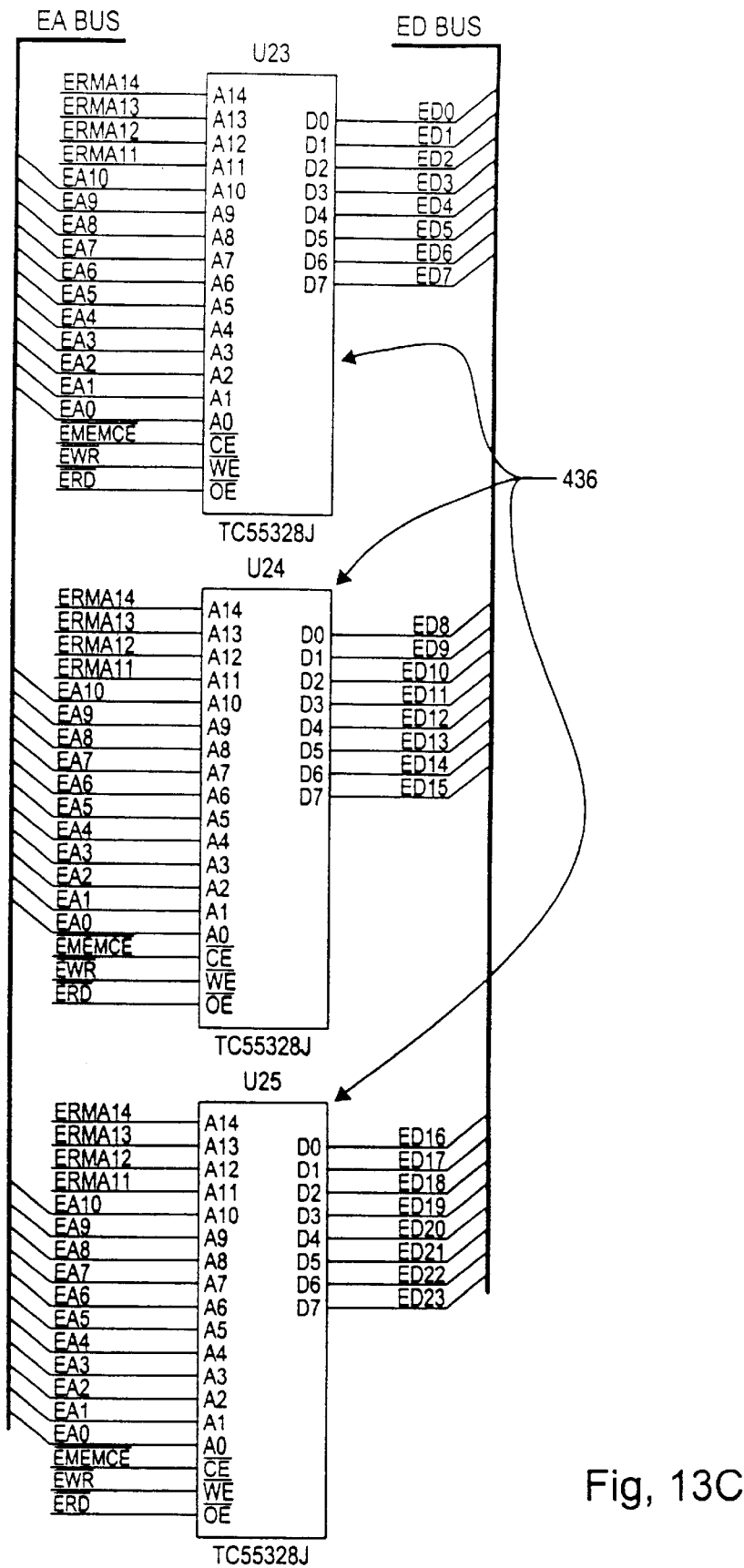
Fig, 13C

ENCODER PLL

DECODER DSP

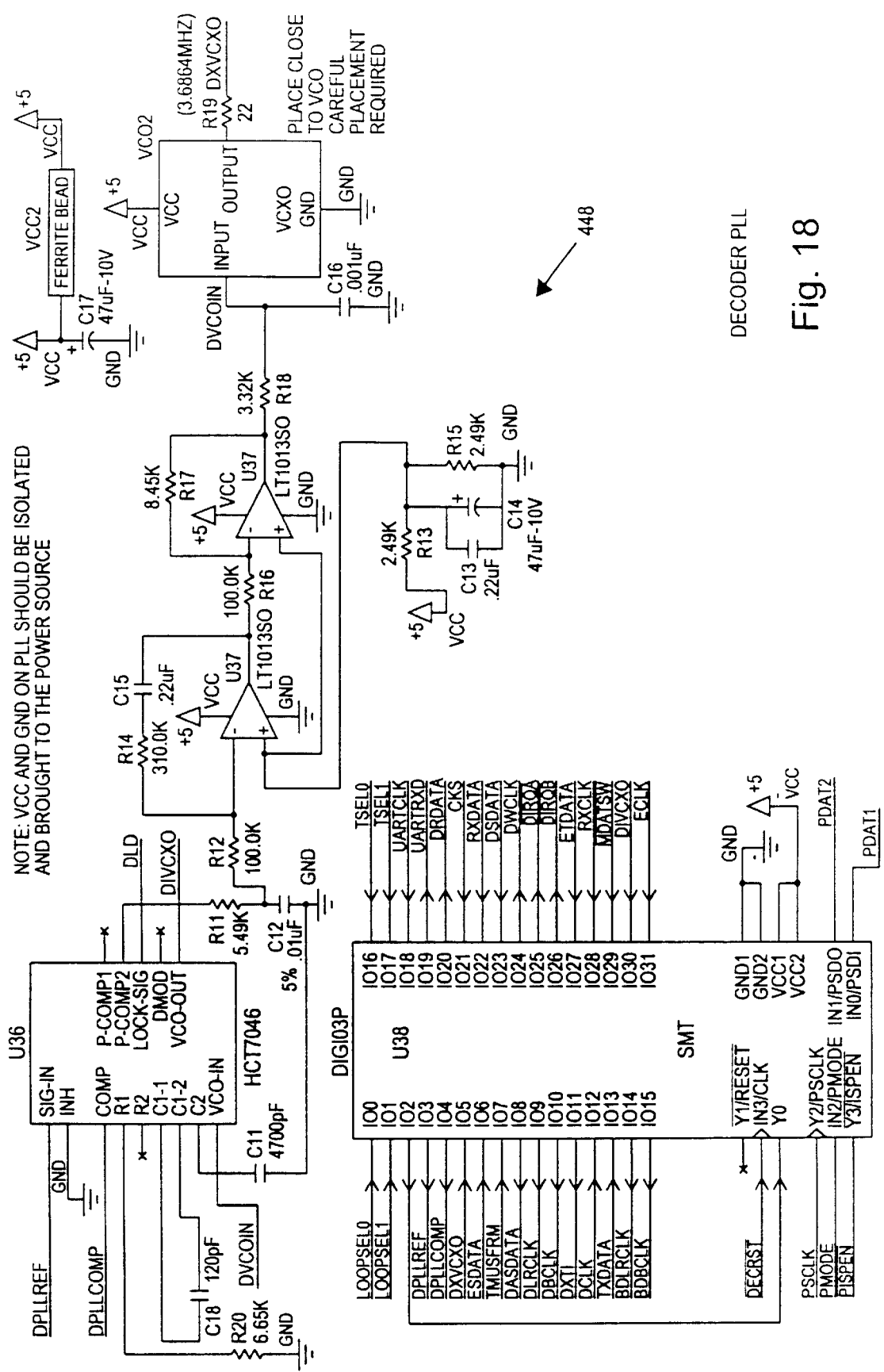
Fig. 18  DECODER PLL

DAC STAGE

US 6,373,927 B1

METHOD AND APPARATUS FOR TRANSMITTING CODED AUDIO SIGNALS THROUGH A TRANSMISSION CHANNEL WITH LIMITED BANDWIDTH

This Application is a continuation of Ser. No. 08,988,709 Dec. 11, 1997 which is a continuation of Ser. No. 08/419,199 Apr. 10, 1995 U.S. Pat. No. 5,706,335.

FIELD OF THE INVENTION

The present invention relates generally to an apparatus and method for transmitting audio signals and pertains, more specifically, to an apparatus and method for transmitting a high quality audio signal, such as wideband speech, through a transmission channel having a limited bandwidth or transmission rate.

BACKGROUND OF THE INVENTION

Human speech lies in the frequency range of approximately 7 Hz to 10 kHz. Because traditional telephone systems only provide for the transmission of analog audio signals in the range of about 300 Hz to 3400 Hz or a bandwidth of about 3 kHz (narrowband speech), certain characteristics of a speaker's voice are lost and the voice sounds somewhat muffled. A telephone system capable of transmitting an audio signal approaching the quality of face-to-face speech requires a bandwidth of about 6 kHz (wideband speech).

Known digital transmission systems are capable of transmitting wideband speech audio signals. However, in order to produce an output audio signal of acceptable quality with a bandwidth of 6 kHz, these digital systems require a transmission channel with a transmission rate that exceeds the capacity of traditional telephone lines. A digital system transmits audio signals by coding an input audio signal into a digital signal made up of a sequence of binary numbers or bits, transmitting the digital signal through a transmission channel, and decoding the digital signal to produce an output audio signal. During the coding process the digital signal is reduced or compressed to minimize the necessary transmission rate of the signal. One known method for compressing wideband speech is disclosed in Recommendation G.722 (CCITT, 1988) A system using the compression method described in G.722 still requires a transmission rate of at least 48 kbit/s to produce wideband speech of an acceptable quality.

Because the maximum transmission rate over traditional telephone lines is 28.8 kbit/s using the most advanced modem technology, alternative transmission channels such as satellite or fiber optics would have to be used with an audio transmission system employing the data compression method disclosed in G.722. Use of these alternative transmission channels is both expensive and inconvenient due to their limited availability. While fiber optic lines are available, traditional copper telephone lines now account for an overwhelming majority of existing lines and it is unlikely that this balance will change anytime in the near future. A digital phone system capable of transmitting wideband speech over existing transmission rate limited telephone phone lines is therefore highly desirable.

OBJECTS OF THE INVENTION

The disclosed invention has various embodiments that achieve one or more of the following features or objects:

An object of the present invention is to provide for the transmission of high quality wideband speech over existing telephone networks.

A further object of the present invention is to provide for the transmission of high quality audio signals in the range of 20 Hz to at least 5,500 Hz over existing telephone networks.

A still further object of the present invention is to accomplish data compression on wideband speech signals to produce a transmission rate of 28.8 kbit/s or less without significant loss of audio quality.

A still further object of the present invention is to provide a device which allows a user to transmit and receive high quality wideband speech and audio over existing telephone networks.

A Still further object of the present invention is to provide a portable device which is convenient to use and allows ease of connection to existing telephone networks.

A still further object of the present invention is to provide a device which is economical to manufacture.

A still further object of the present invention is to provide easy and flexible programmability.

SUMMARY OF THE INVENTION

In accordance with the present invention, the disadvantages of the prior art have been overcome by providing a digital audio transmitter system capable of transmitting high quality, wideband speech over a transmission channel with a limited bandwidth such as a traditional telephone line.

More particularly, the digital audio transmitter system of the present invention includes a coder for coding an input audio signal to a digital signal having a transmission rate that does not exceed the maximum allowable transmission rate for traditional telephone lines and a decoder for decoding the digital signal to provide an output audio signal with an audio bandwidth of wideband speech. A coder and a decoder may be provided in a single device to allow two-way communication between multiple devices. A device containing a coder and a decoder is commonly referred to as a CODEC (COder/DECoder).

These and other objects, advantages and novel features of the present invention, as well as details of an illustrative embodiment thereof, will be more fully understood from the following description and from the drawings.

BRIEF DESCRIPTION OF THE DRAWINGS

FIG. 18 is a detailed circuit diagram of the clock generator portion of the decoder of FIG. 16.

DETAILED DESCRIPTION OF THE PREFERRED EMBODIMENT

Figure 1:
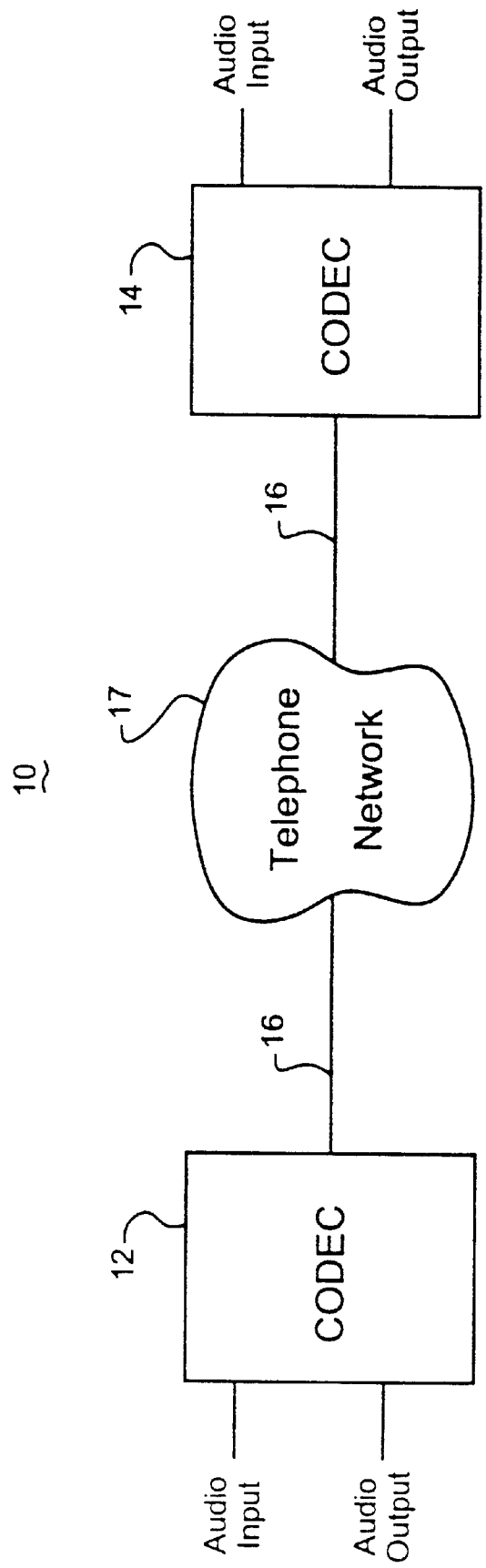
FIG. 1 is a block diagram of a digital audio transmission system including a first CODEC and second CODEC in accordance with the present invention.

A digital audio transmission system 10, as shown in FIG. 1, includes a first CODEC (COder/DECoder) 12 for transmitting and receiving a wideband audio signal such as wideband speech to and from a second CODEC 14 via a traditional copper telephone line 16 and telephone network 17. When transmitting an audio signal, the first CODEC 12 performs a coding process on the input analog audio signal which includes converting the input audio signal to a digital signal and compressing the digital signal to a transmission rate of 28.8 kbit/s or less. The preferred embodiment compresses the digital using a modified version of the ISO/MPEG (International Standards Organization/Motion Picture Expert Groups) compression scheme according to the software routine disclosed in the microfiche software appendix filed herewith. The coded digital signal is sent using standard modem technology via the telephone line 16 and telephone network 17 to the second CODEC 14. The second CODEC 14 performs a decoding process on the coded digital signal by correcting transmission errors, decompressing the digital signal and reconverting it to produce an output analog audio signal.

Figure 2:
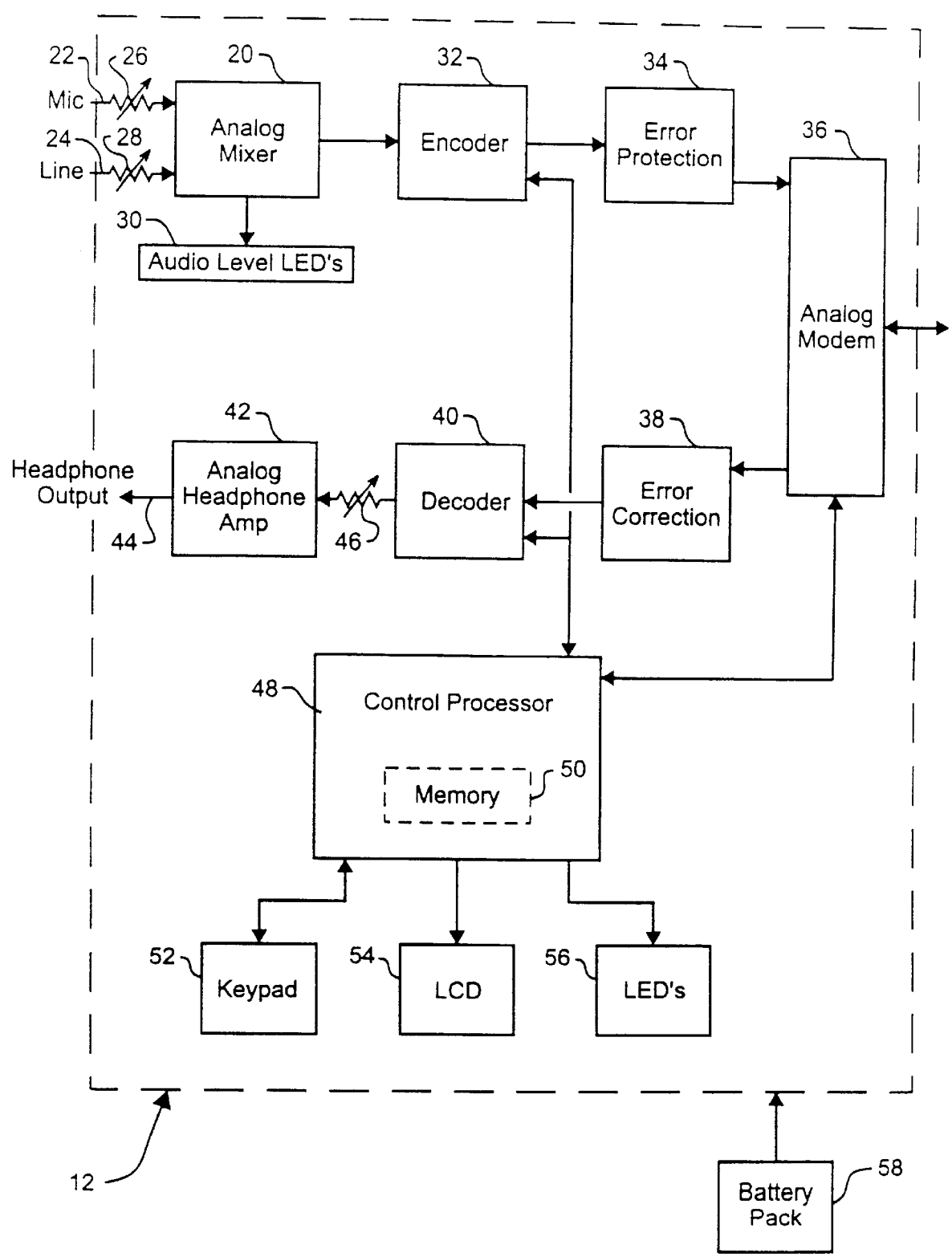
FIG. 2 is a block diagram of a CODEC of FIG. 1.

FIG. 2 shows a CODEC 12 which includes an analog mixer 20 for receiving, amplifying, and mixing an input audio signal through a number of input lines. The input lines may include a MIC line 22 for receiving an analog audio signal from a microphone and a generic LINE 24 input for receiving an analog audio signal from an audio playback device such as a tape deck. The voltage level of an input audio signal on either the MIC line 22 or the generic LINE 24 can be adjusted by a user of the CODEC 12 by adjusting the volume controls 26 and 28. When the analog mixer 20 is receiving an input signal through both the MIC line 22 and the generic LINE 24, the two signals will be mixed or combined to produce a single analog signal. Audio level LED's 30 respond to the voltage level of a mixed audio signal to indicate when the voltage exceeds a desired threshold level. A more detailed description of the analog mixer 20 and audio level LED's 30 appears below with respect to FIGS. 3 and 4.

The combined analog signal from the analog mixer 20 is sent to the encoder 32 where the analog signal is first converted to a digital signal. The sampling rate used for the analog to digital conversion is preferably one-half the transmission rate of the signal which will ultimately be transmitted to the second CODEC 14 (shown in FIG. 1). After analog to digital conversion, the digital signal is then compressed using a modified version of the ISO/MPEG algorithm. The ISO/MPEG compression algorithm is modified to produce a transmission rate of 28.8 kbit/s. This is accomplished by the software routine that is disclosed in the software appendix.

The compressed digital signal from the encoder 32 is then sent to an error protection processor 34 where additional error protection data is added to the digital signal. A Reed-Solomon error protection format is used by the error protection processor 34 to provide both burst and random error protection. The error protection processor 34 is described below in greater detail with respect to FIGS. 12 and 15.

The compressed and error protected digital signal is then sent to an analog modem 36 where the digital signal is converted back to an analog signal for transmitting. As shown in FIG. 1, this analog signal is sent via a standard copper telephone line 16 through a telephonenetwork 17 to the second CODEC 14. The analog modem 36 is preferably a V.34 synchronous modem. This type of modem is commercially available.

The analog modem 36 is also adapted to receive an incoming analog signal from the second CODEC 14 (or another CODEC) and reconvert the analog signal to a digital signal. This digital signal is then sent to an error correction processor 38 where error correction according to a Reed-Soloman format is performed.

The corrected digital signal is then sent to a decoder 40 where it is decompressed using the modified version of the ISO/MPEG algorithm as disclosed in the software appendix. After decompression the digital signal is converted to an analog audio signal. A more detailed description of the decoder 40 appears below with respect to FIGS. 7, 16, 17 and 18. The analog audio signal may then be perceived by a user of the CODEC 12 by routing the analog audio signal through a headphone amp 42 wherein the signal is amplified. The volume of the audio signal at the headphone output line 44 is controlled by volume control 46.

The CODEC 12 includes a control processor 48 for controlling the various functions of the CODEC 12 according to software routines stored in memory 50. A more detailed description of the structure of the control processor appears below with respect to FIGS. 7, 8, 9, 10, and 11. One software routine executed by the control processor allows the user of the CODEC 12 to initiate calls and enter data such as phone numbers. When a call is initiated the control processor sends a signal including the phone number to be dialed to the analog modem 36. Data entry is accomplished via a keypad 52 and the entered data may be monitored by observation of an LCD 54. The keypad 52 also includes keys for selecting various modes of operation of the CODEC 12. For example, a user may select a test mode wherein the control processor 48 controls the signal path of the output of the encoder to input of decoder to bypass the telephone network allows testing of compression and decompression algorithms and their related hardware. Also stored in memory 50 is the compression algorithm executed by the encoder 32 and the decompression algorithm executed by the decoder 40.

Additional LED's 56 are controlled by the control processor 48 and may indicate to the user information such as "bit synchronization" (achieved by the decoder) or "power on". An external battery pack 58 is connected to the CODEC 12 for supplying power.

Figure 3:
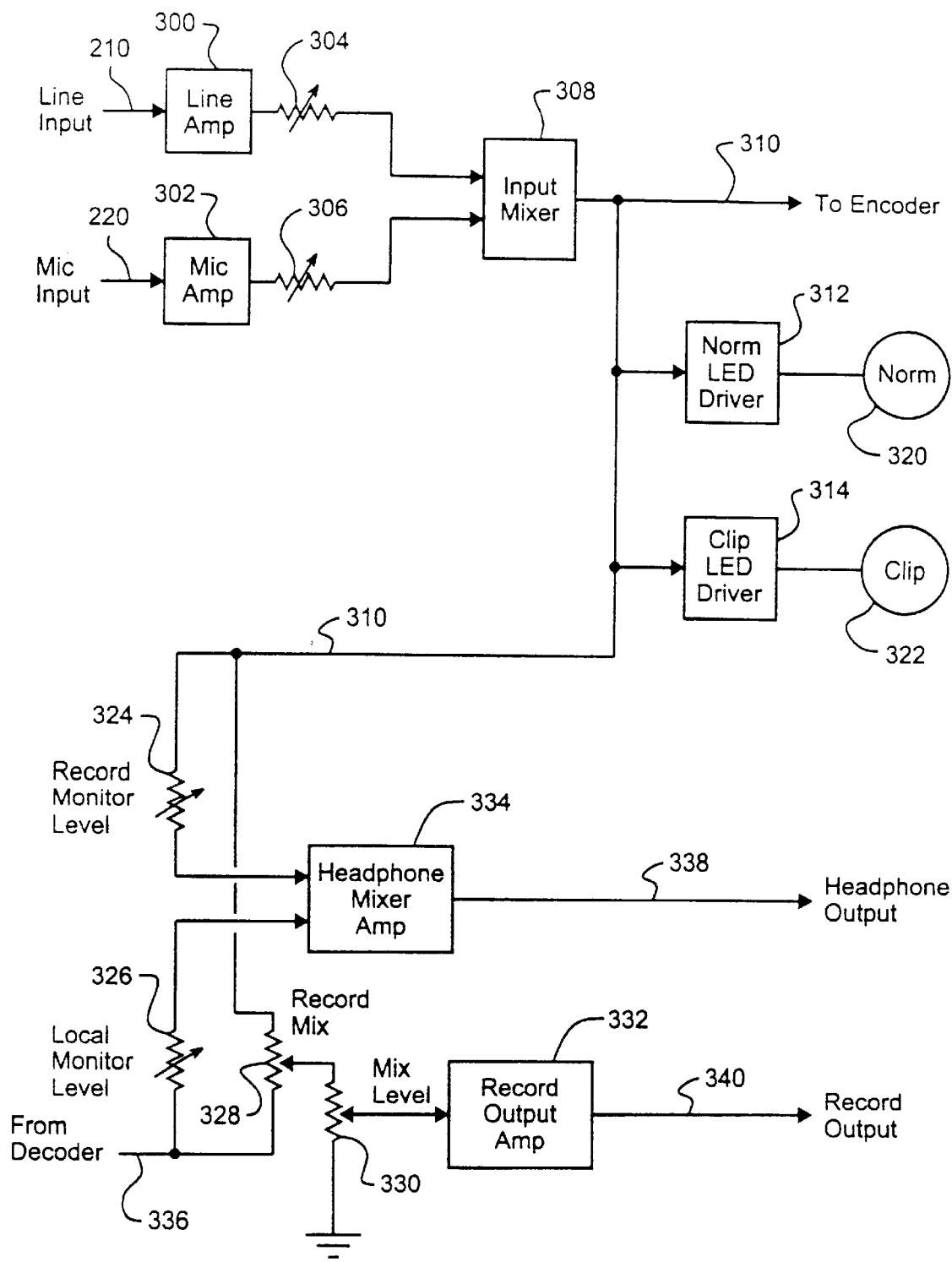
FIG. 3 is a block diagram of an audio input/output circuit of a CODEC.
Figure 4:
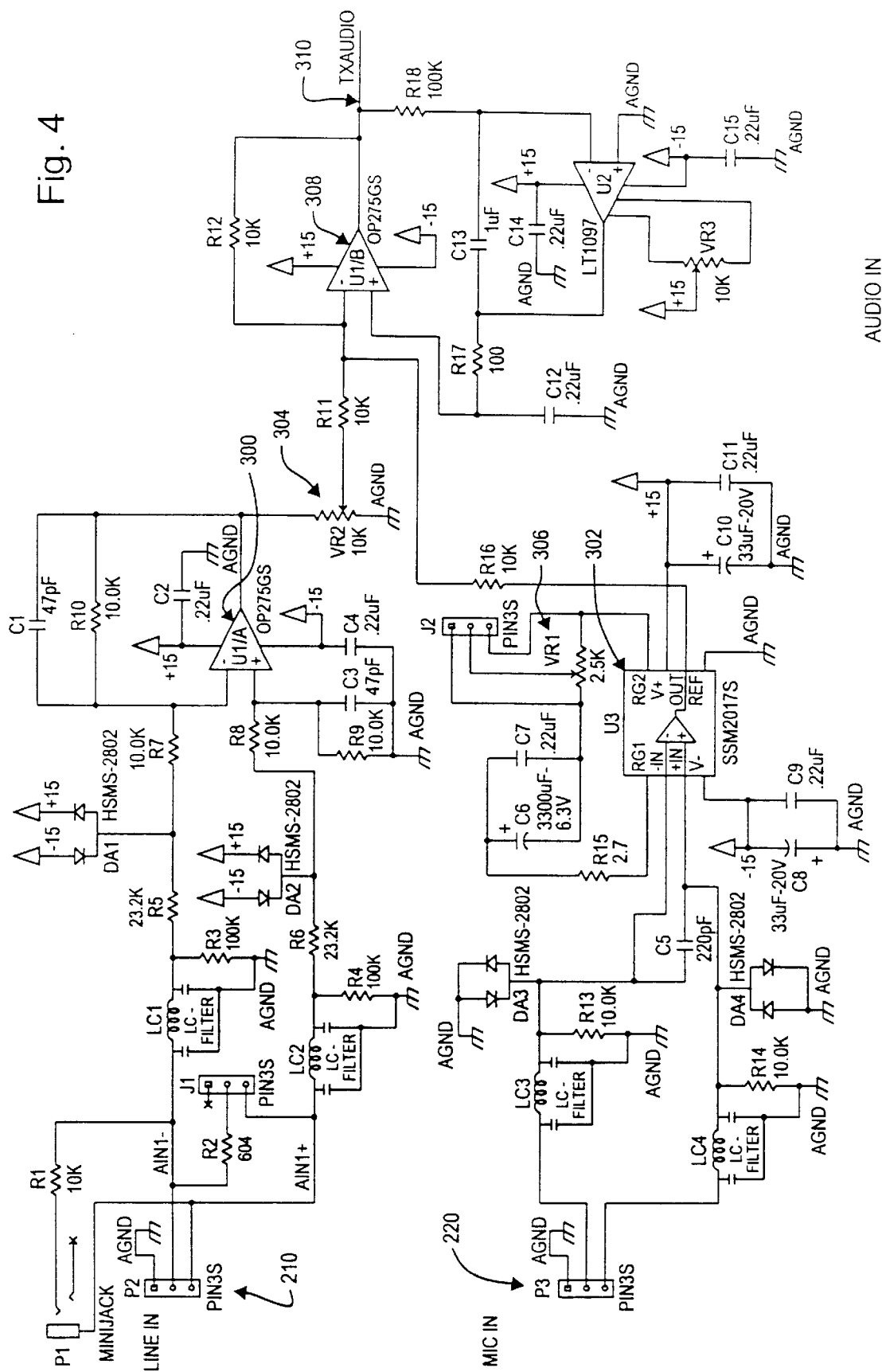
FIG. 4 is a detailed circuit diagram of the audio input portion of FIG. 3.
Figure 5:
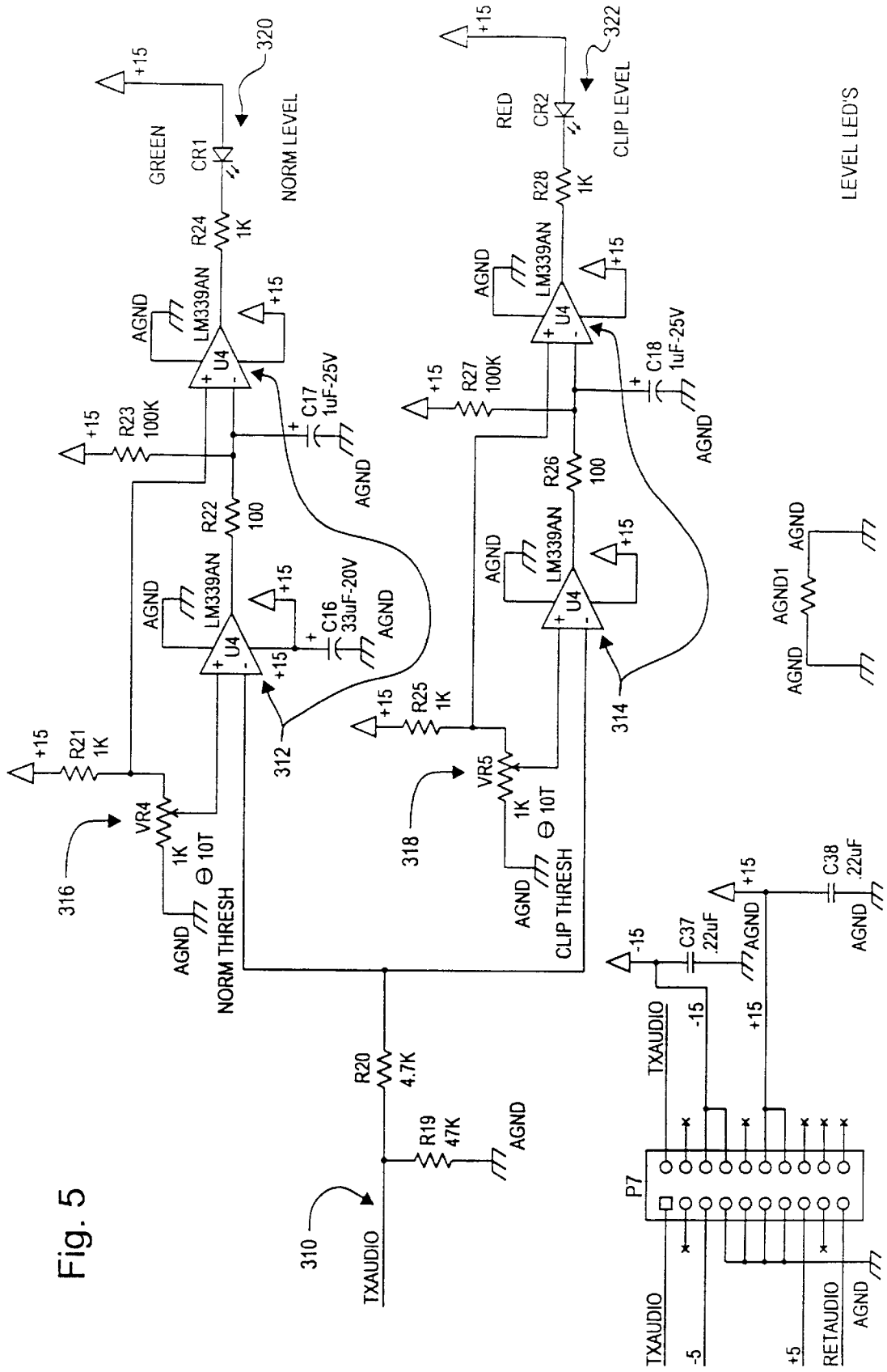
FIG. 5 is a detailed circuit diagram of the level LED's portion of FIG. 3.
Figure 6:
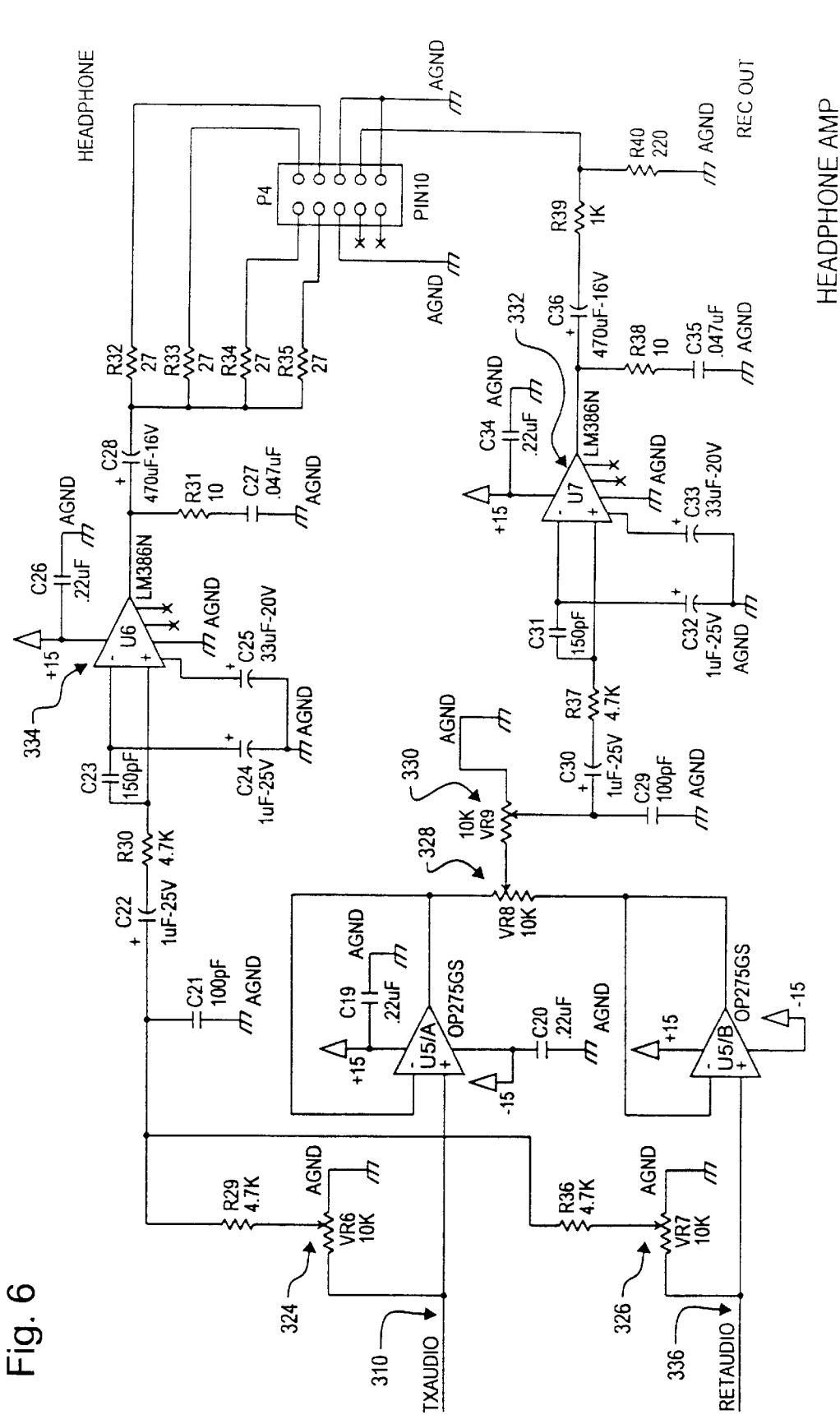
FIG. 6 is a detailed circuit diagram of the headphone amp portion of FIG. 3.

FIG. 3 shows a lower level block diagram of the analog mixer 20, audio level LED's 30 and analog headphone amp 42 as shown in FIG. 2. FIGS. 4, 5 and 6 are the detailed circuit diagrams corresponding to FIG. 3.

Referring to FIGS. 3 and 4, line input 210 is an incoming line level input signal while mic input 220 is the microphone level input. These signals are amplified by a line amp 300 and a mic amp 302 respectively and their levels are adjusted by line level control 304 and mic level control 306 respectively. The microphone and line level inputs are fed to the input mixer 308 where they are mixed and the resulting combined audio input signal 310 is developed.

Referring now to FIGS. 3 and 5, the audio input signal 310 is sent to the normal and overload signal detectors, 312 and 314 respectively, where their level is compared to a normal threshold 316 which defines a normal volume level and a clip threshold 318 which defines an overload volume level. When the audio input signal 310 is at a normal volume level a NORM LED 320 is lighted. When the audio input signal 310 is at an overload volume level a CLIP LED 322 is lighted.

Figure 16:
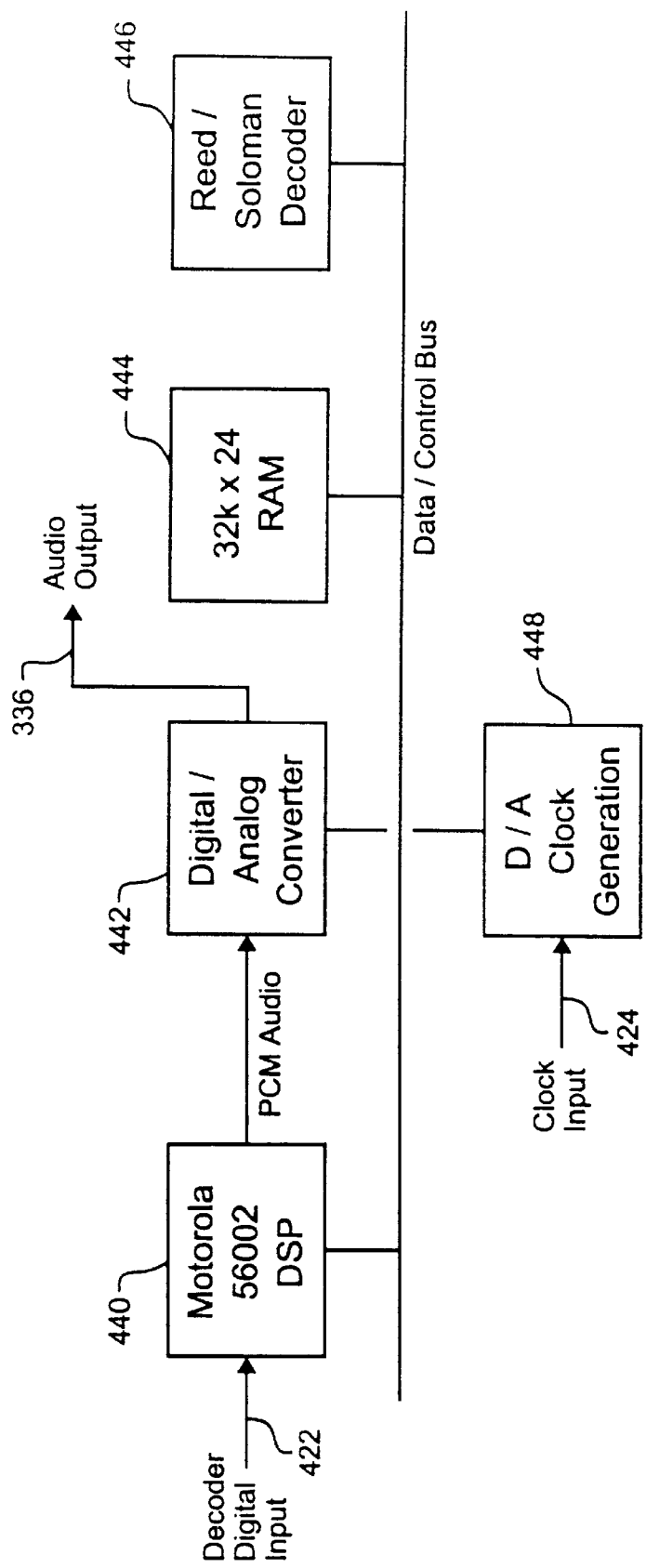
FIG. 16 is a block diagram of a decoder of a CODEC.
Figure 20:
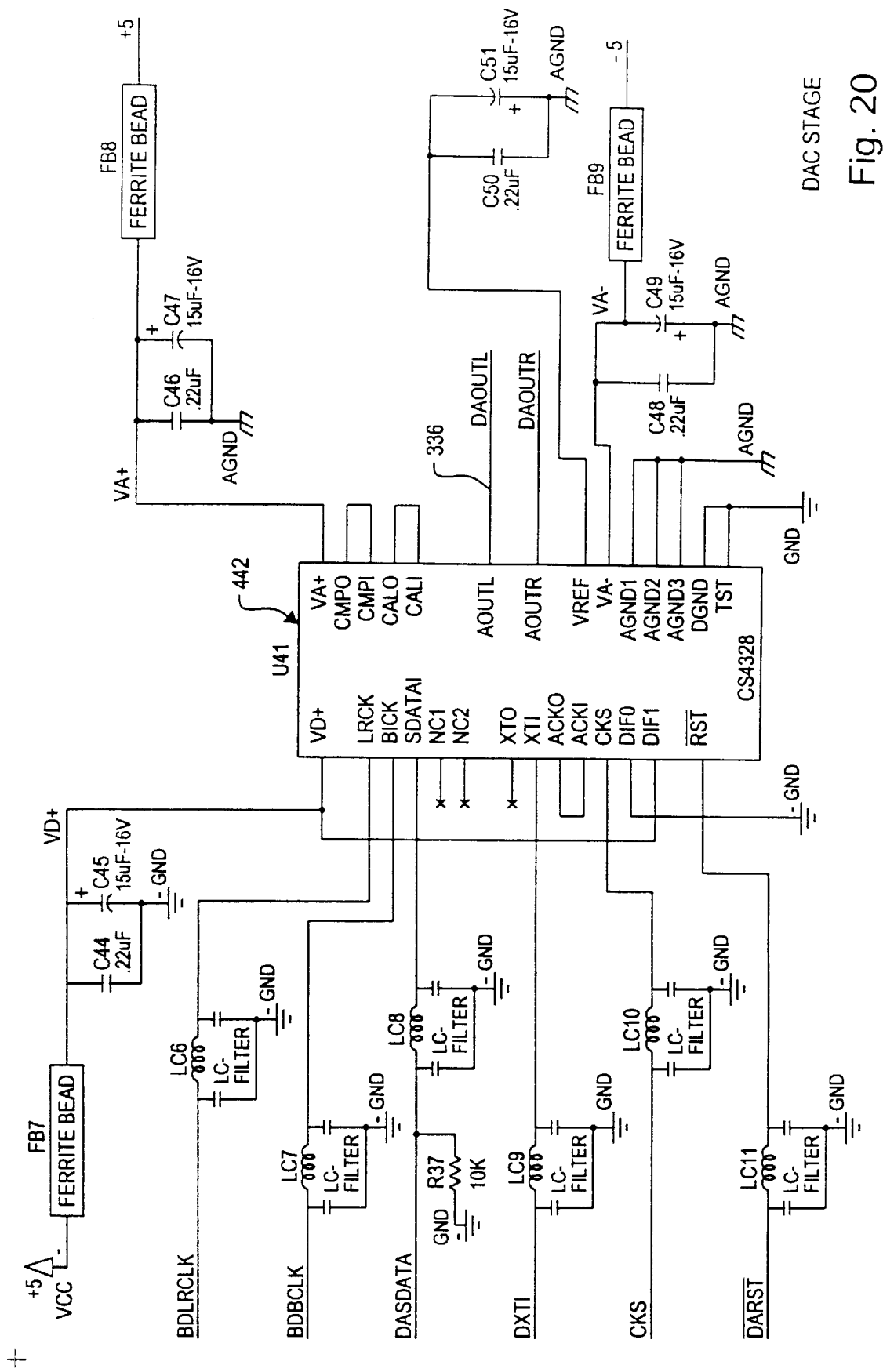
FIG. 20 is a detailed circuit diagram of the digital/analog converter portion of the decoder of FIG. 16.

Referring now to FIGS. 3 and 6, the audio input signal 310 is fed into the record monitor level control 324, where its level is adjusted before being mixed with the audio output signal 336 from the digital/analog converter 442 (shown in FIG. 16 and 20). The audio output signal 336 is fed to the local monitor level control 326 before it is fed into the headphone mixer amplifier 334. The resulting output signal from the headphone mixer amplifier 334 goes to a headphone output connector 338 on the exterior of the CODEC 12 where a pair of headphones may be connected.

The audio input signal 310 and audio output signal 336 are fed to record mix control 328 which is operable by the user. The output of this control is fed to a mix level control 330 (also operable by a user) and then to the record output amplifier 332. The resulting output signal of the record output amplifier 332 goes to a record output 340 on the exterior of the CODEC 12.

Figure 7:
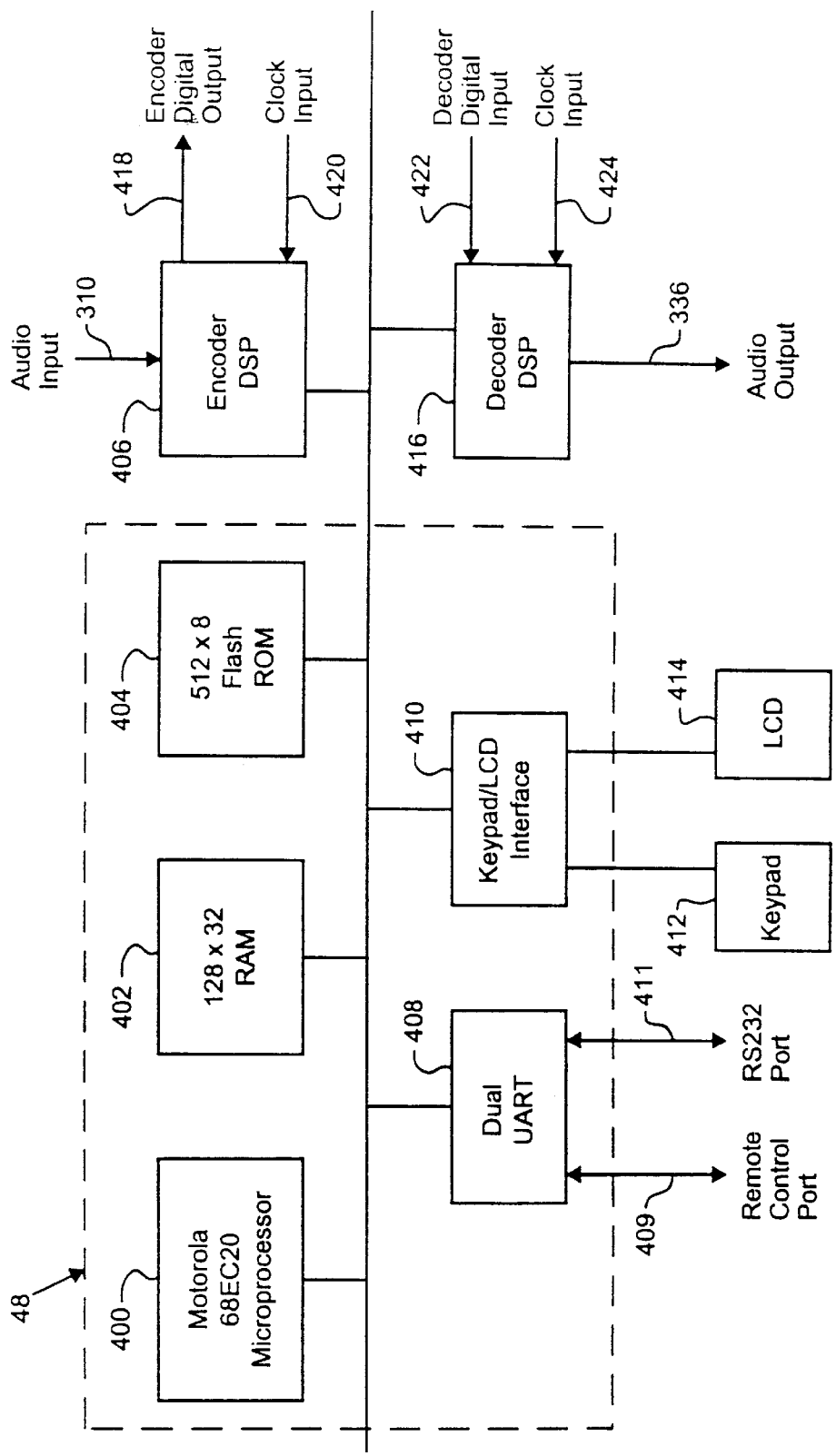
FIG. 7 is a block diagram of a control processor of a CODEC.

FIG. 7 shows a lower level block diagram of the control processor 48 (shown in FIG. 2). The encoder 406 (referenced as number 32 in FIG. 2) is further described in FIG. 12 while the decoder 416 (referenced as number 40 in FIG. 2) is refined in FIG. 16. FIGS. 8, 9, 10, 11, 13, 14, 15, 17, 18, 19 and 20 are detailed circuit diagrams.

Figure 8A:
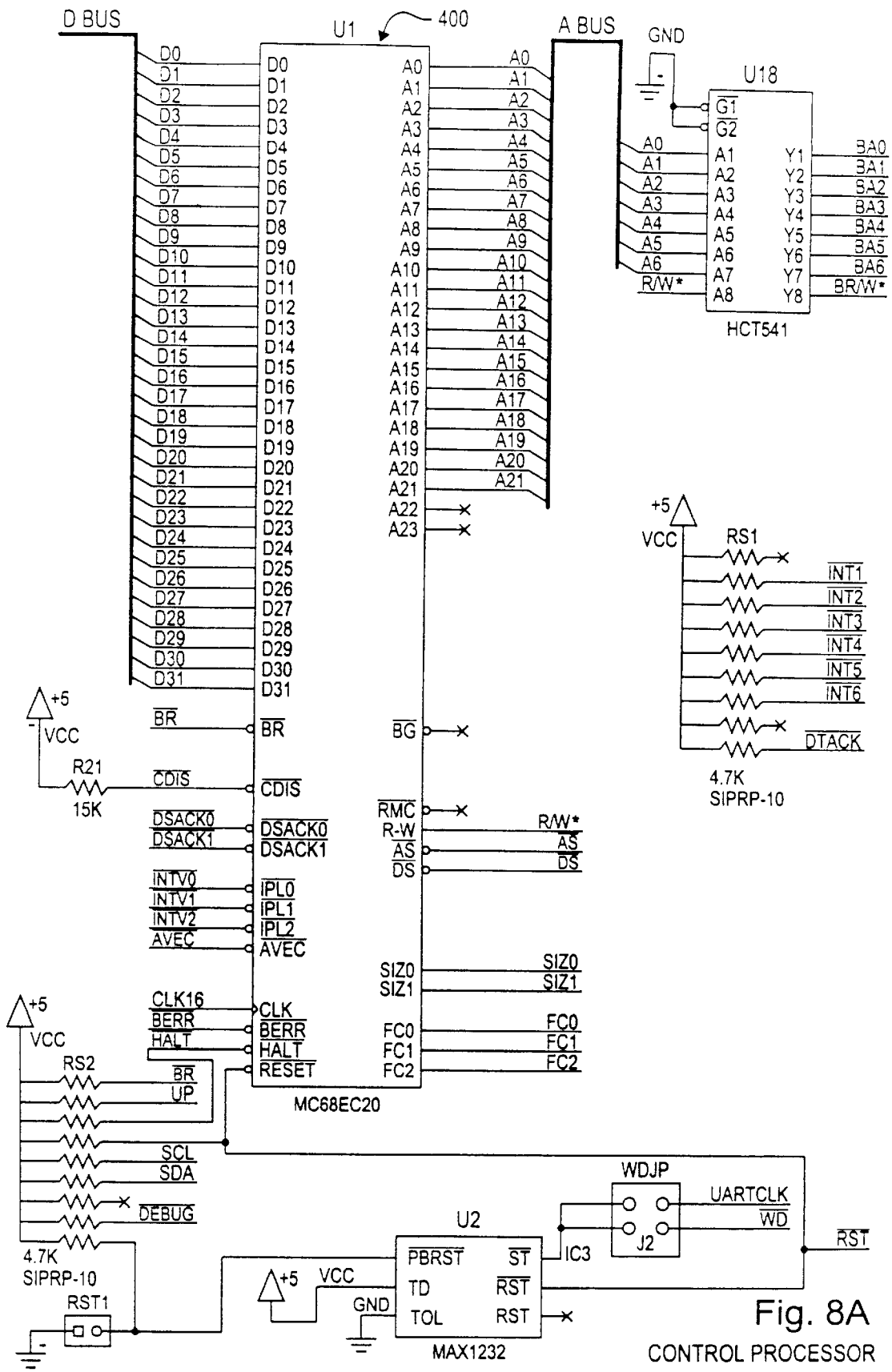
FIG. 8 is a detailed circuit diagram of the microprocessor portion of the control processor of FIG. 7.
Figure 8B:
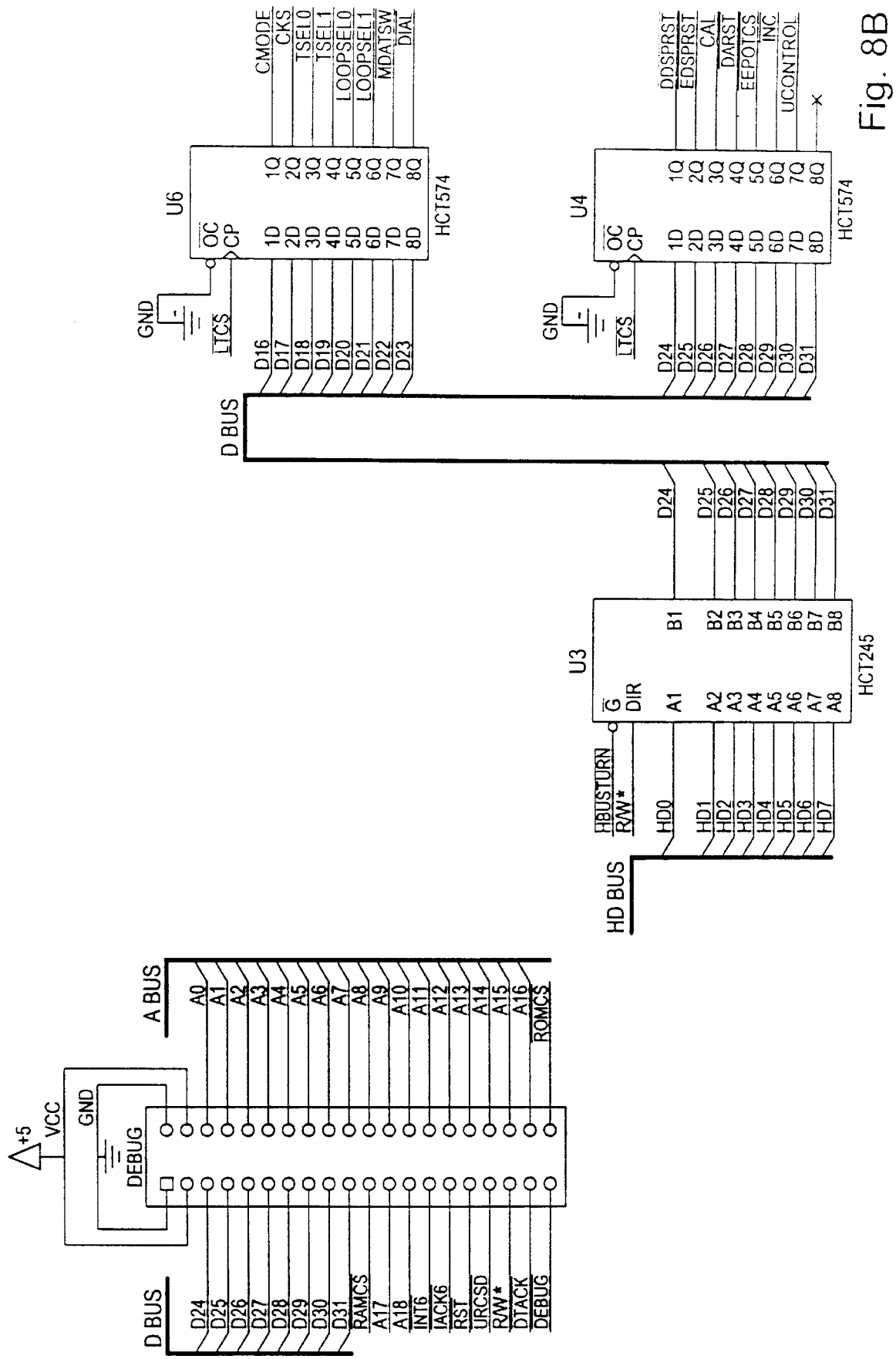
Figure 8C:
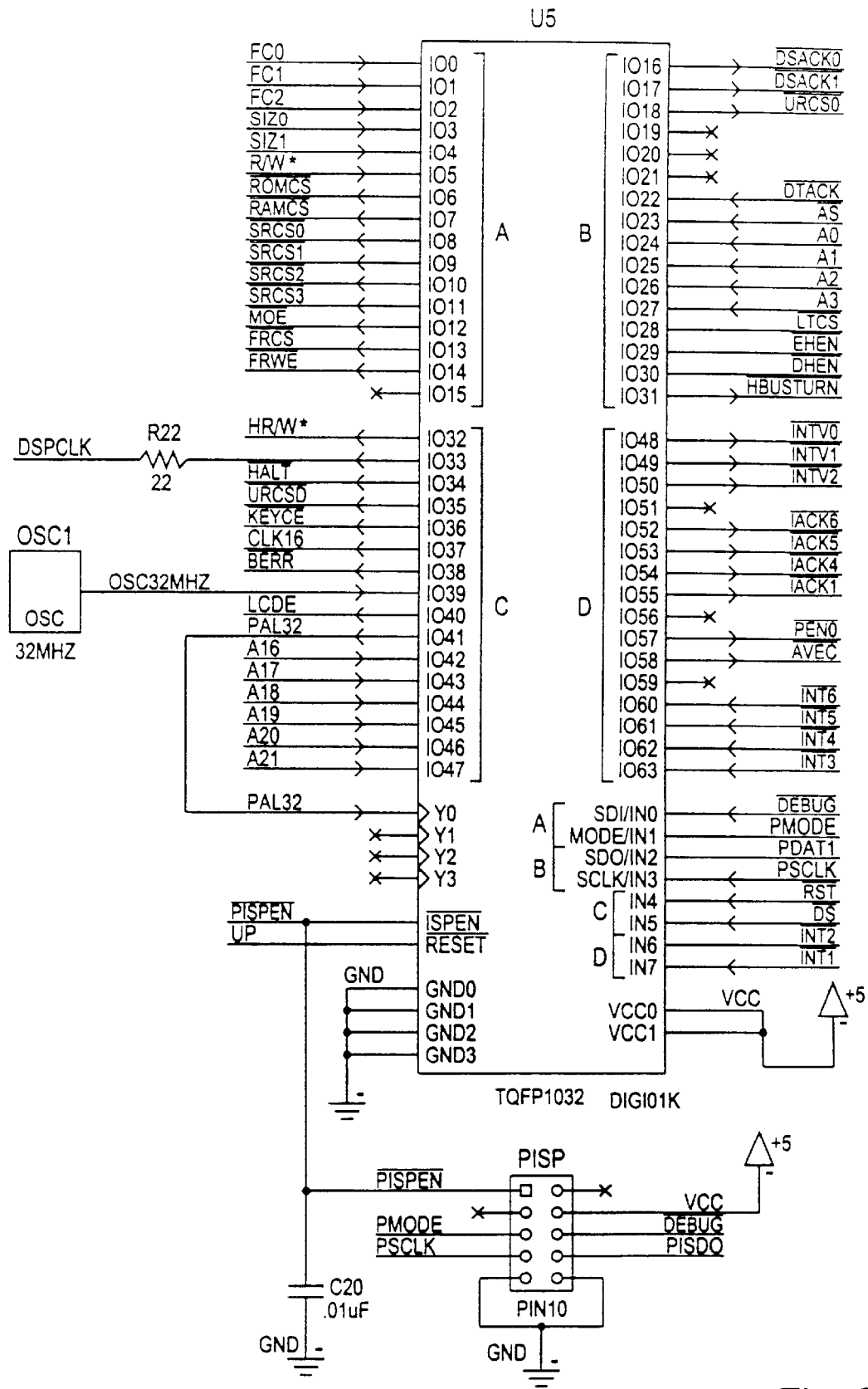

Referring to FIGS. 7 and 8 the microprocessor 400 is responsible for the communication between the user, via keypad 412 and LCD display 414, and the CODEC 12. The keypad 412 is used to input commands to the system while the LCD display 414, is used to display the responses of the keypad 412 commands as well as alert messages generated by the CODEC 12.

Figure 9A:
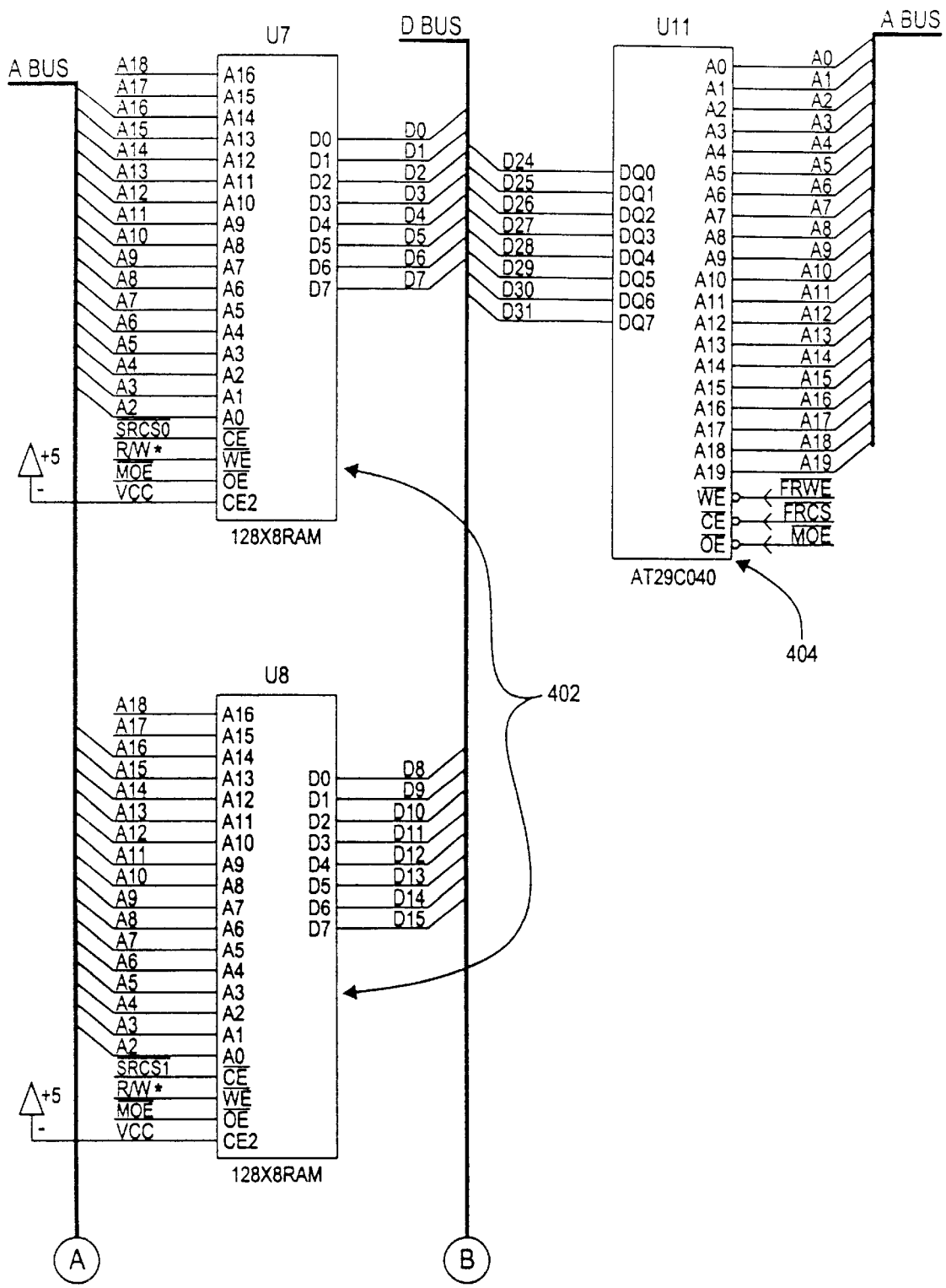
FIG. 9 is a detailed circuit diagram of the memory portion of the control processor of FIG. 7.
Figure 9B:
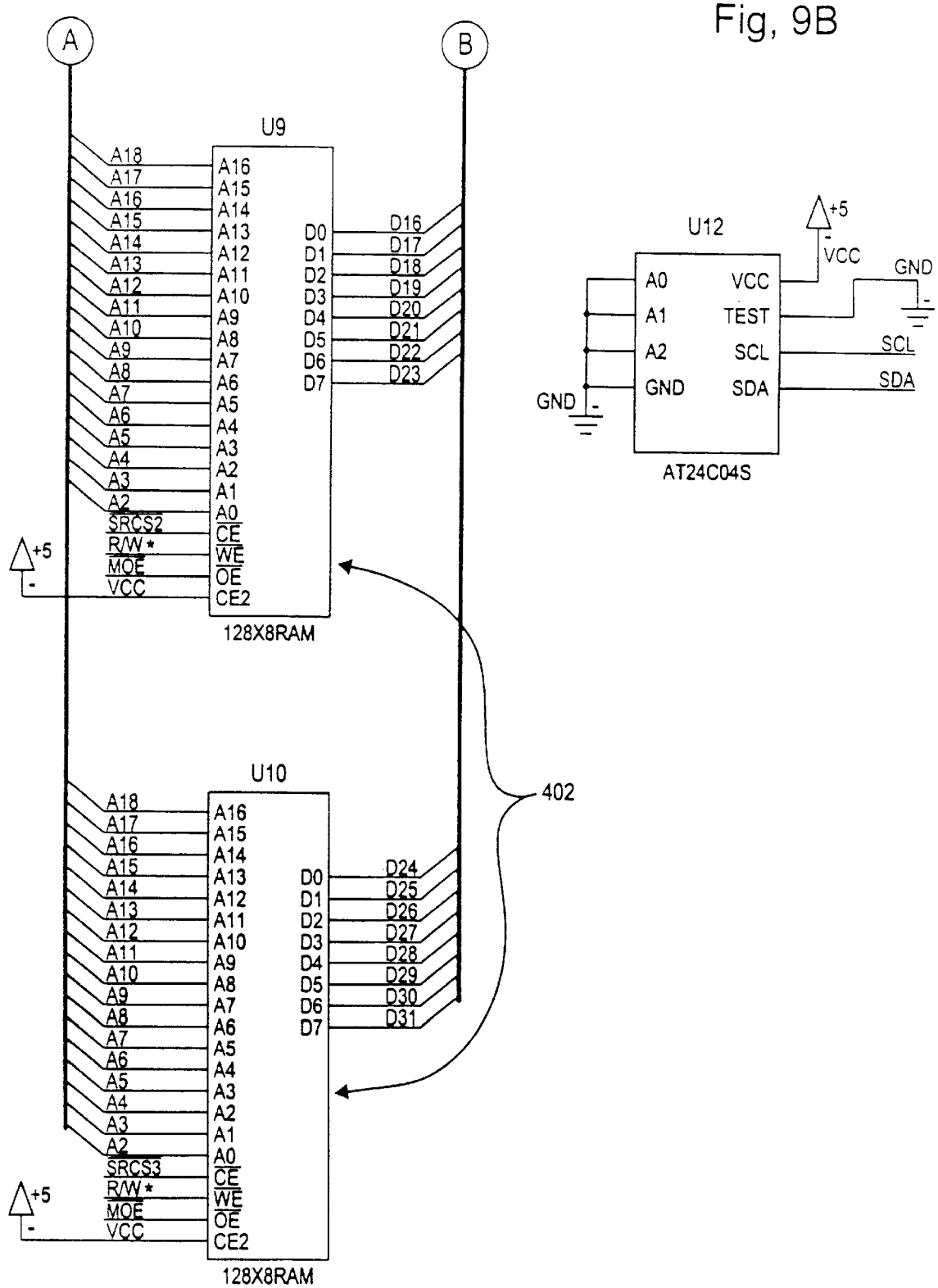

Referring now to FIGS. 7 and 9, the RAM (random access memory) 402 is used to hold a portion of the control processor control software routines. The flash ROM (read only memory) 404 holds the software routine (disclosed in the software appendix) which controls the modified ISO/MPEG compression scheme performed by encoder DSP 406 and the modified ISO/MPEG decompression scheme performed by the decoder DSP 416, as well as the remainder of the control processor control software routines.

Figure 10:
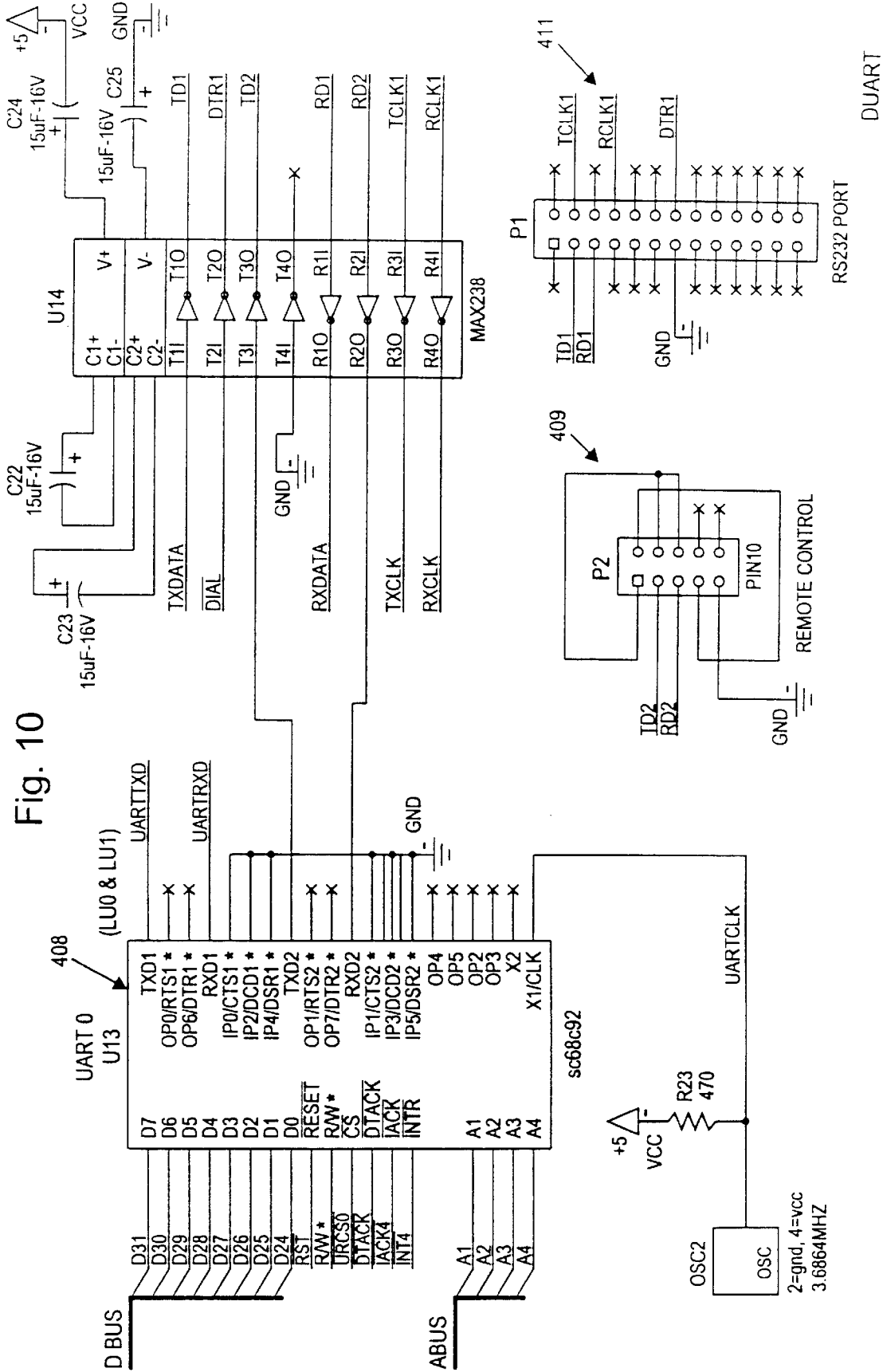
FIG. 10 is a detailed circuit diagram of the dual UART portion of the control processor of FIG. 7.

Referring now to FIGS. 7 and 10, the dual UART (universal asynchronous receiver/transmitter) 408 is used to provide asynchronous input/output for the control processor 48. The rear panel remote control port 409 and the rear panel RS232 port 411 are used to allow control by an external computer. This external control can be used in conjunction with or instead of the keypad 412 and/or LCD display 414.

Figure 11:
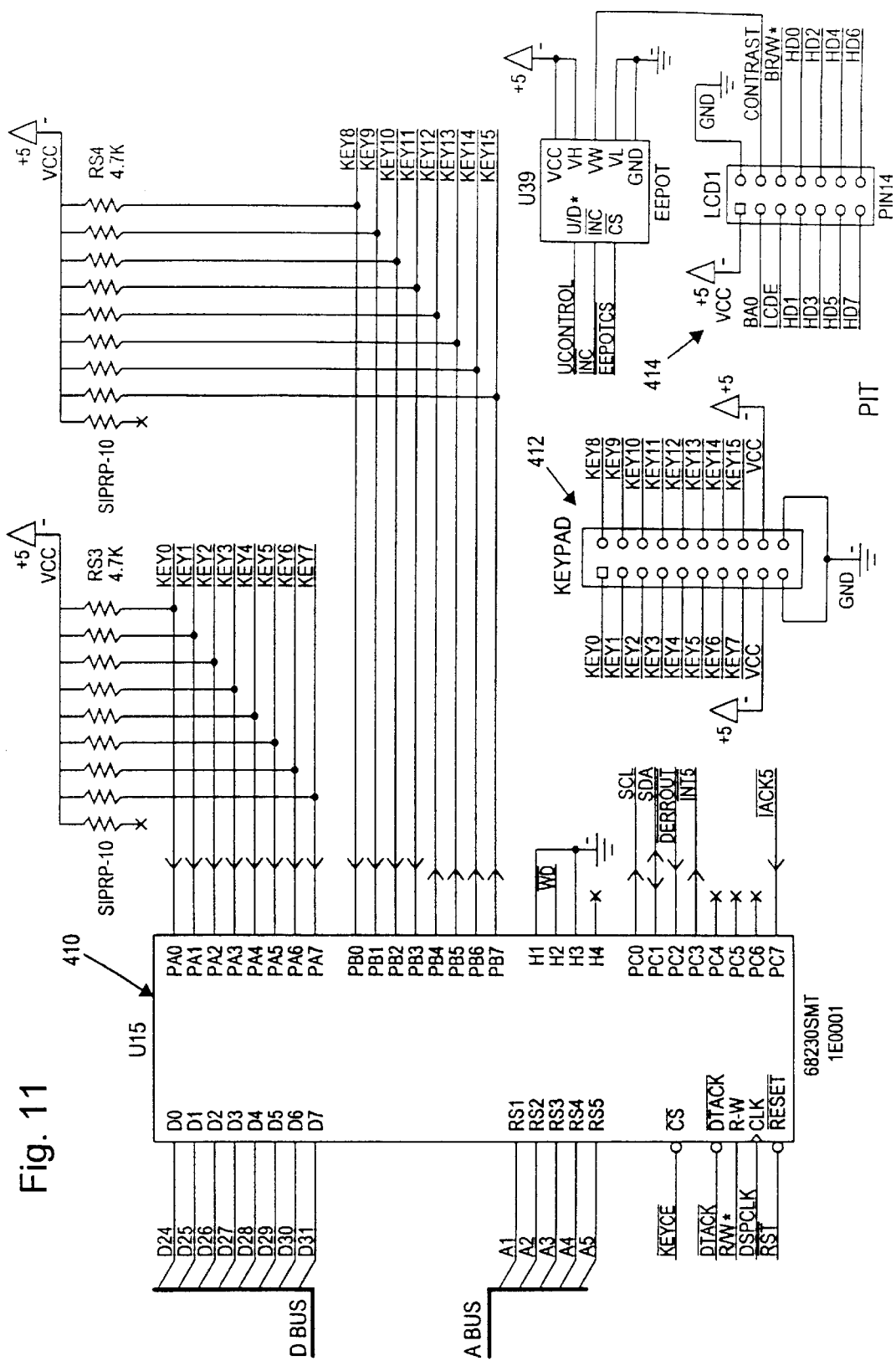
FIG. 11 is a detailed circuit diagram of the keypad, LCD display and interface portions of the control processor of FIG. 7.

Referring now to FIGS. 7 and 11, the programmable interval timer circuit 410 is used to interface the control processor with the keypad and LCD display.

Figure 13A:
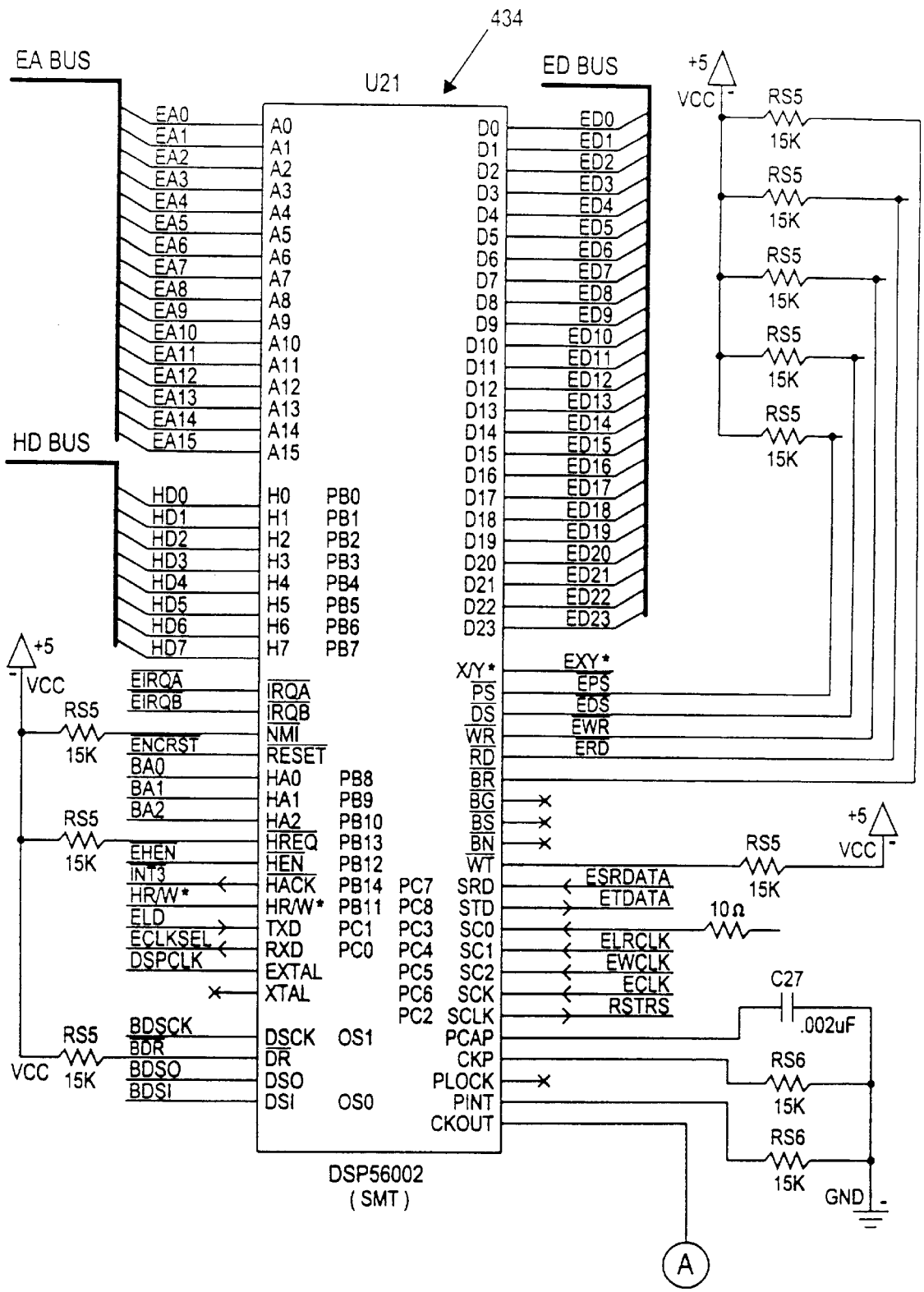
FIG. 13 is a detailed circuit diagram of the encoder digital signal processor and memory portions of the encoder of FIG. 12.
Figure 13B:
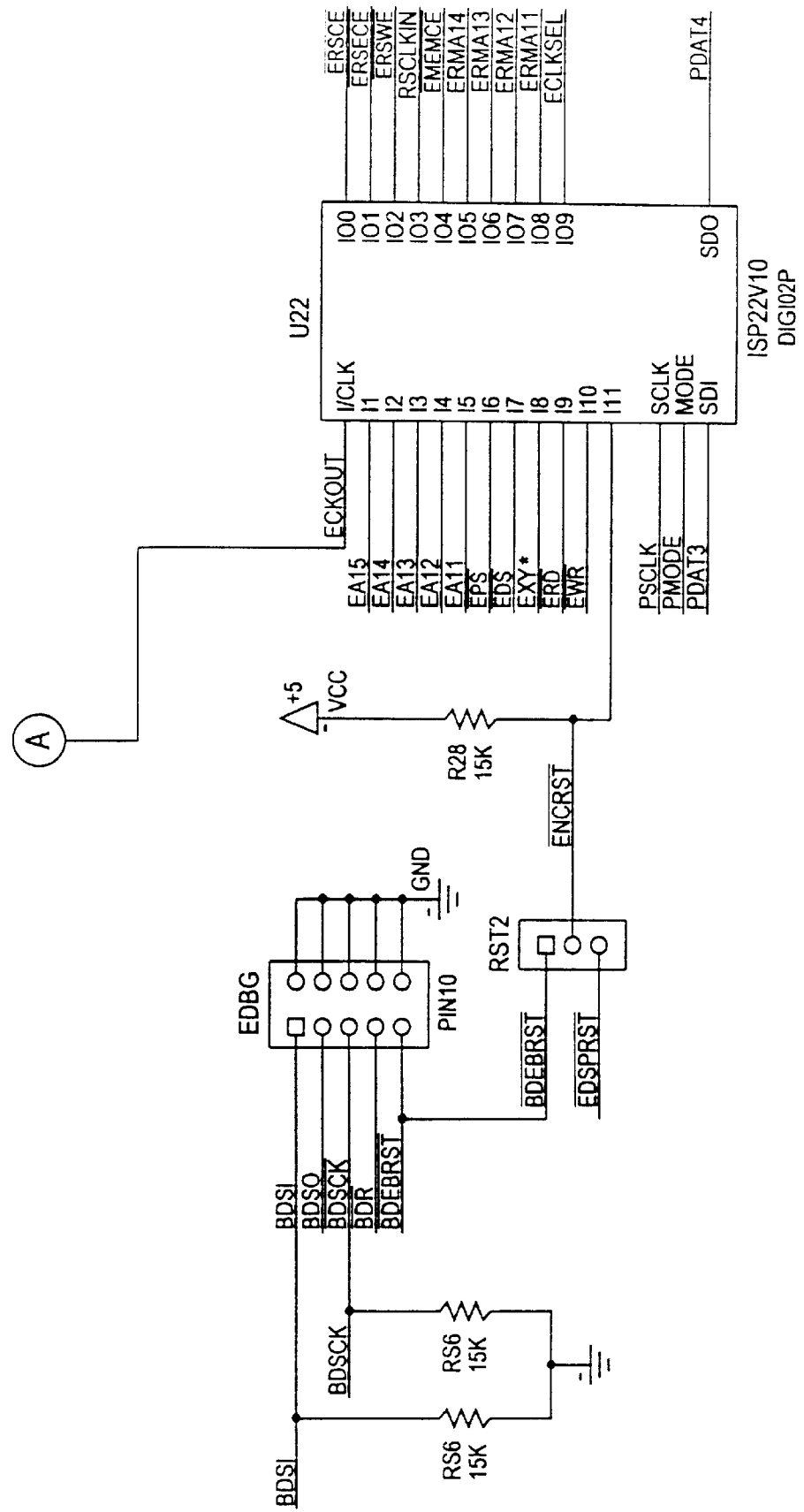

Referring now to FIGS. 7, 8 and 13, the encoder DSP (digital signal processor) 434 receives a digital pulse code modulated signal 430 from the analog/digital converter 450. The encoder DSP 434 performs the modified ISO/MPEG compression scheme according to the software routine (described in the software appendix) stored in RAM memory 436 to produce a digital output 418.

Figure 12:
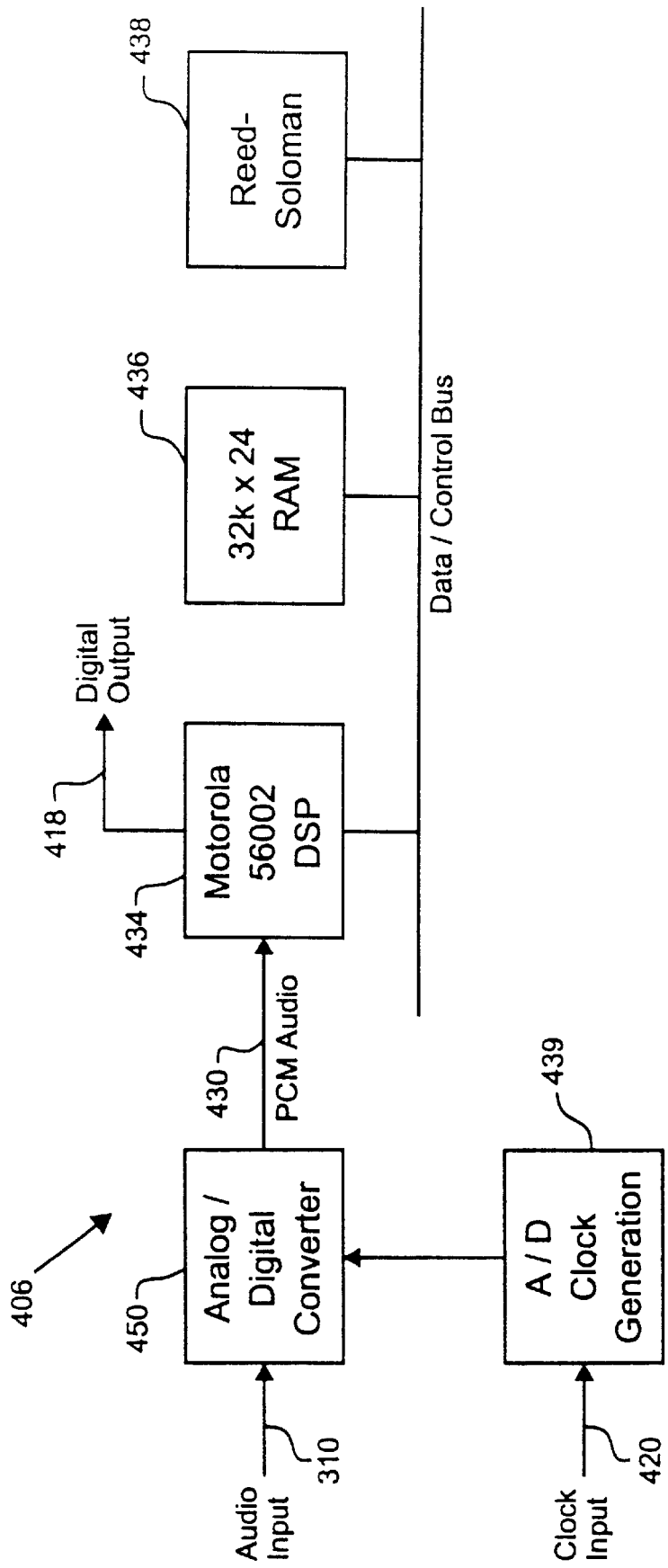
FIG. 12 is a block diagram of an encoder of a CODEC.
Figure 14:
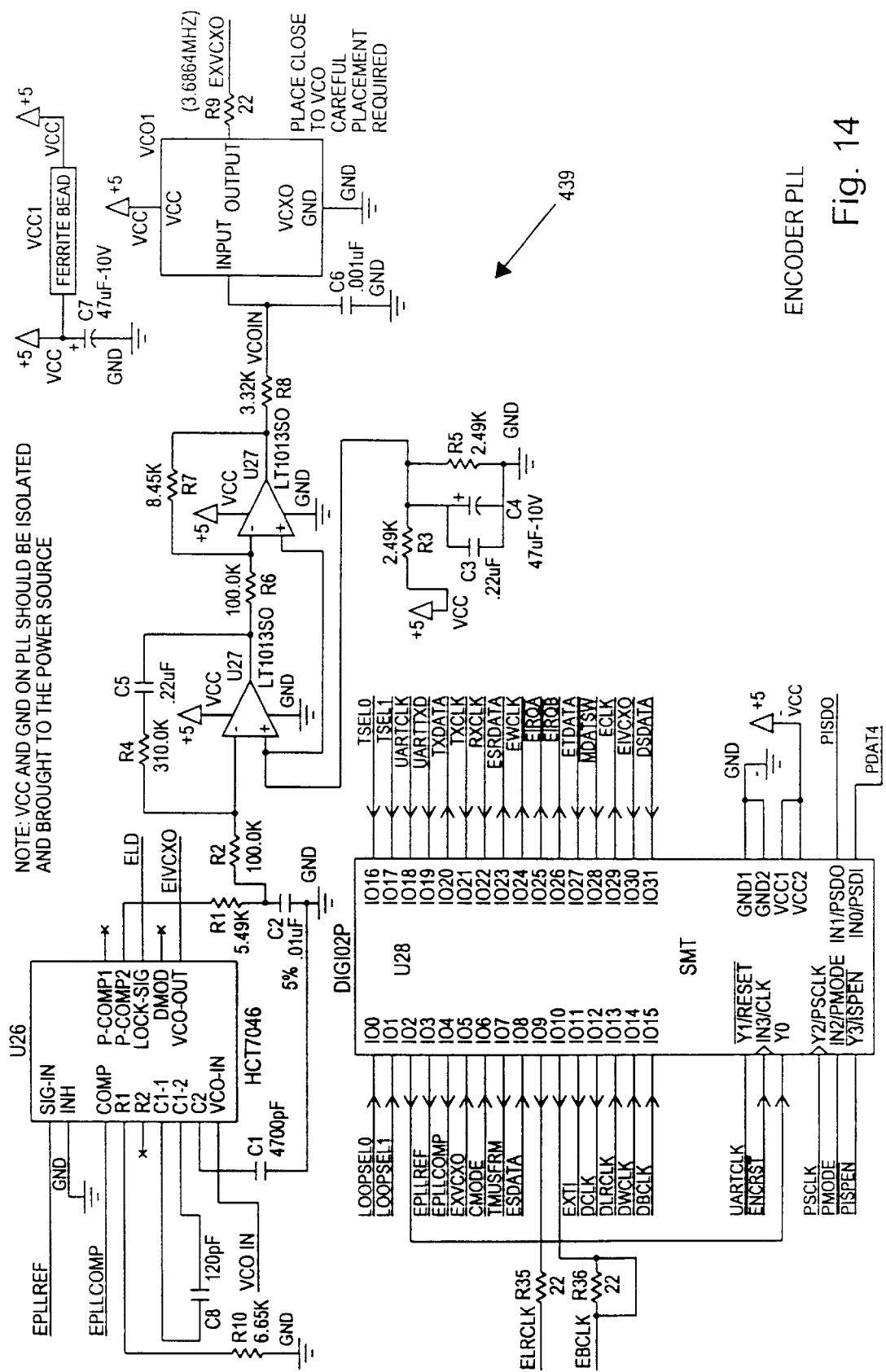
FIG. 14 is a detailed circuit diagram of the clock generator portion of the encoder of FIG. 12.

The A/D clock generation unit 439 is shown in FIGS. 12 and 14. The function of this circuitry is to provide all the necessary timing signals for the analog digital converter 450 and the encoder DSP 434.

Figure 15:
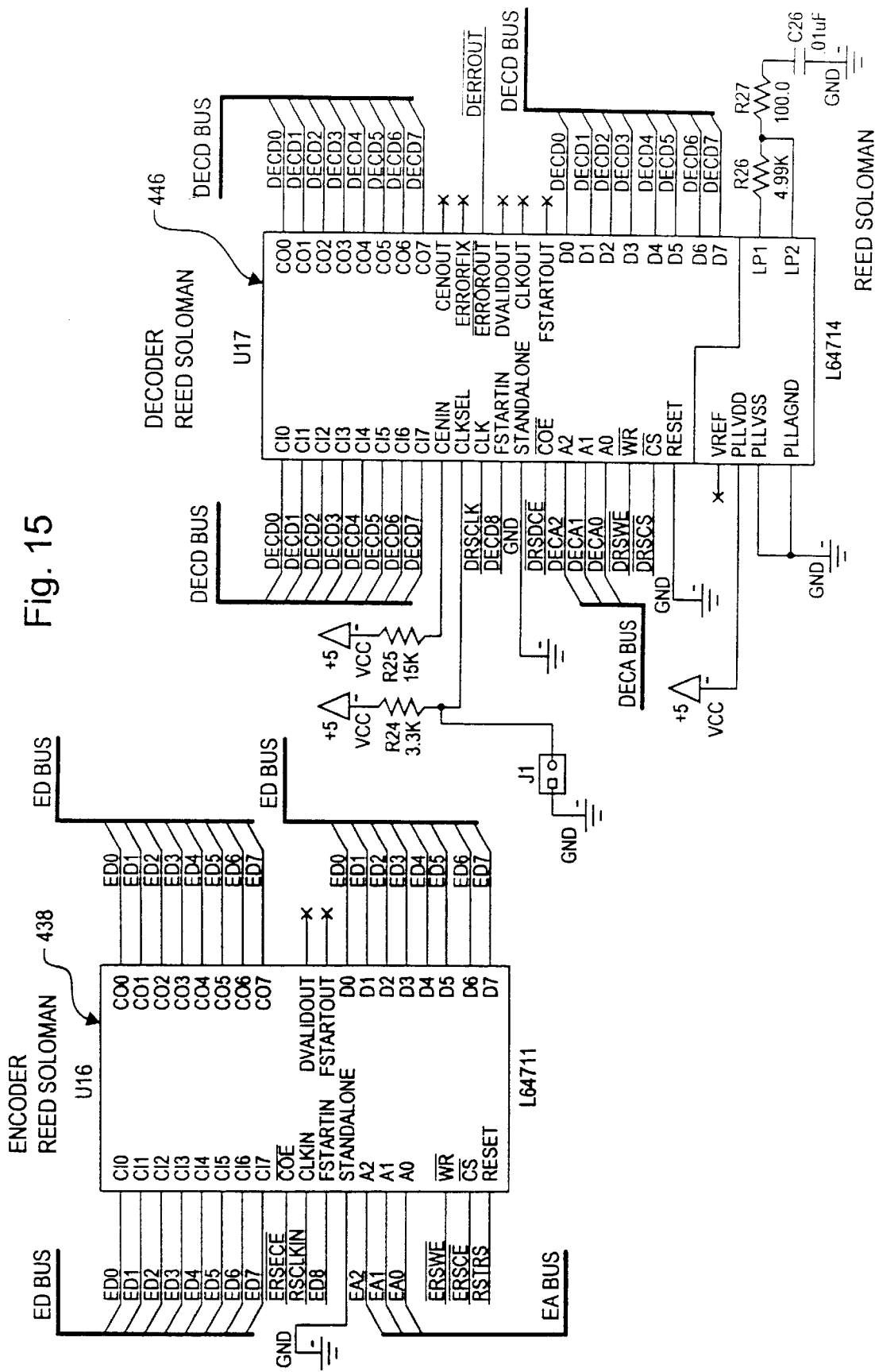
FIG. 15 is a detailed circuit diagram of the Reed-Soloman encoder and decoder portions of FIGS. 12 and 16.

The Reed-Soloman error correction encoding circuitry 438 is shown in FIGS. 12 and 15. The function of this unit is to add parity information to be used by the Reed-Soloman decoder 446 (also shown in FIG. 16) to repair any corrupted bits received by the Reed-Soloman decoder 446. The Reed-Soloman corrector 438 utilizes a shortened Reed-Soloman GF(256) code which might contain, for example, code blocks containing 170 eight-bit data words and 8 eight-bit parity words.

Figure 17A:
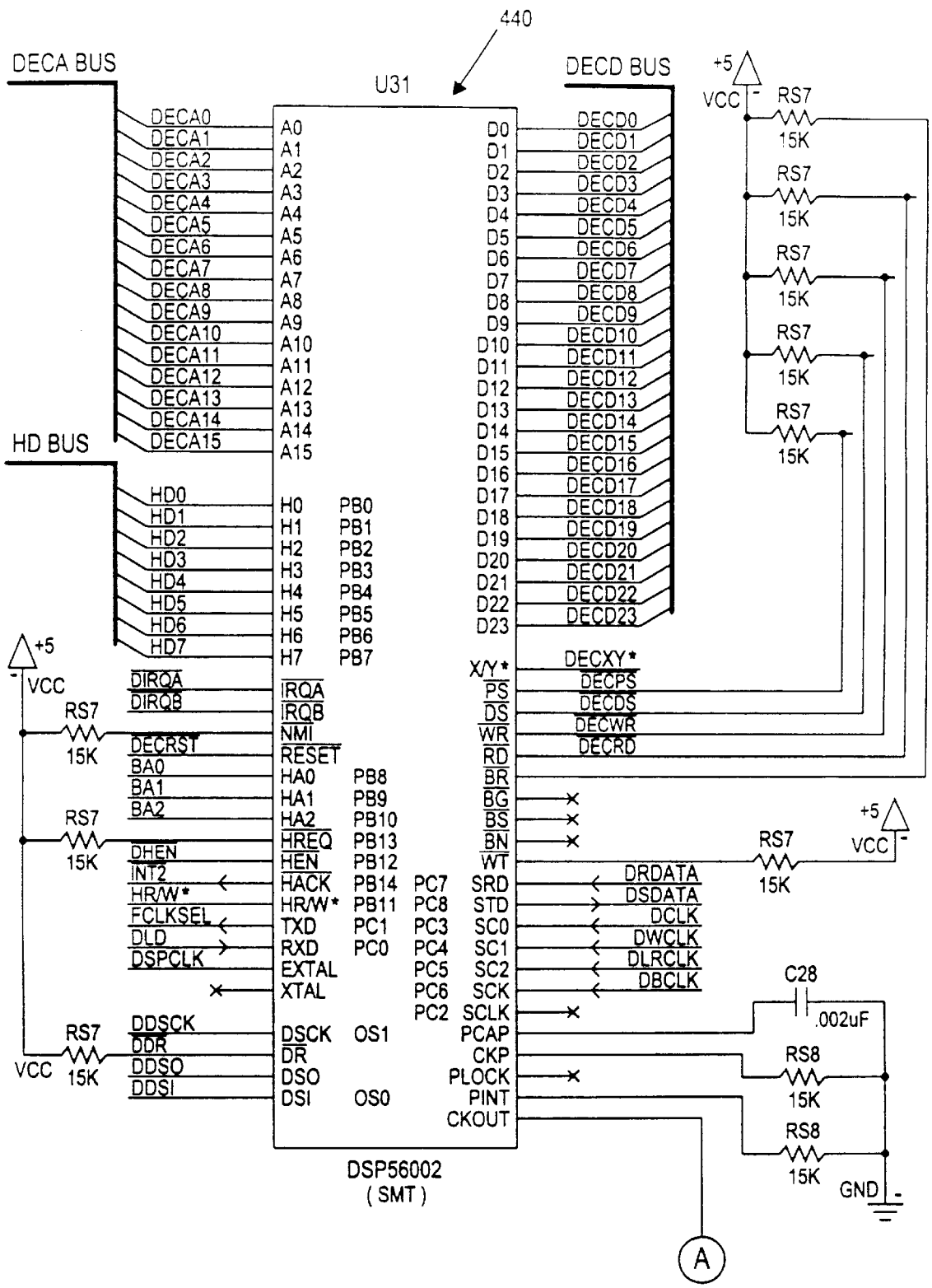
FIG. 17 is a detailed circuit diagram of the encoder digital signal processor and memory portions of the decoder of FIG. 16.
Figure 17B:
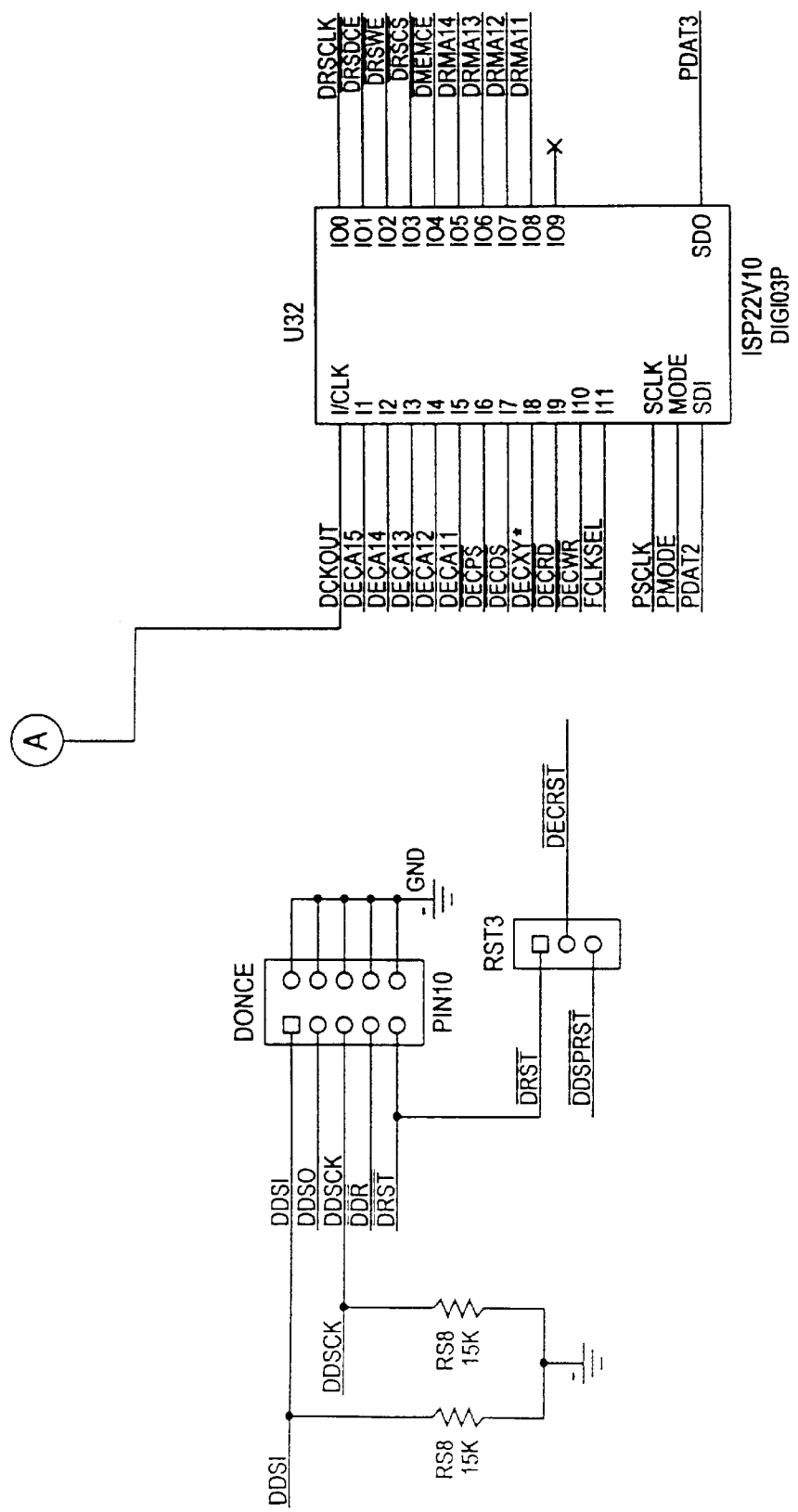
Figure 17C:
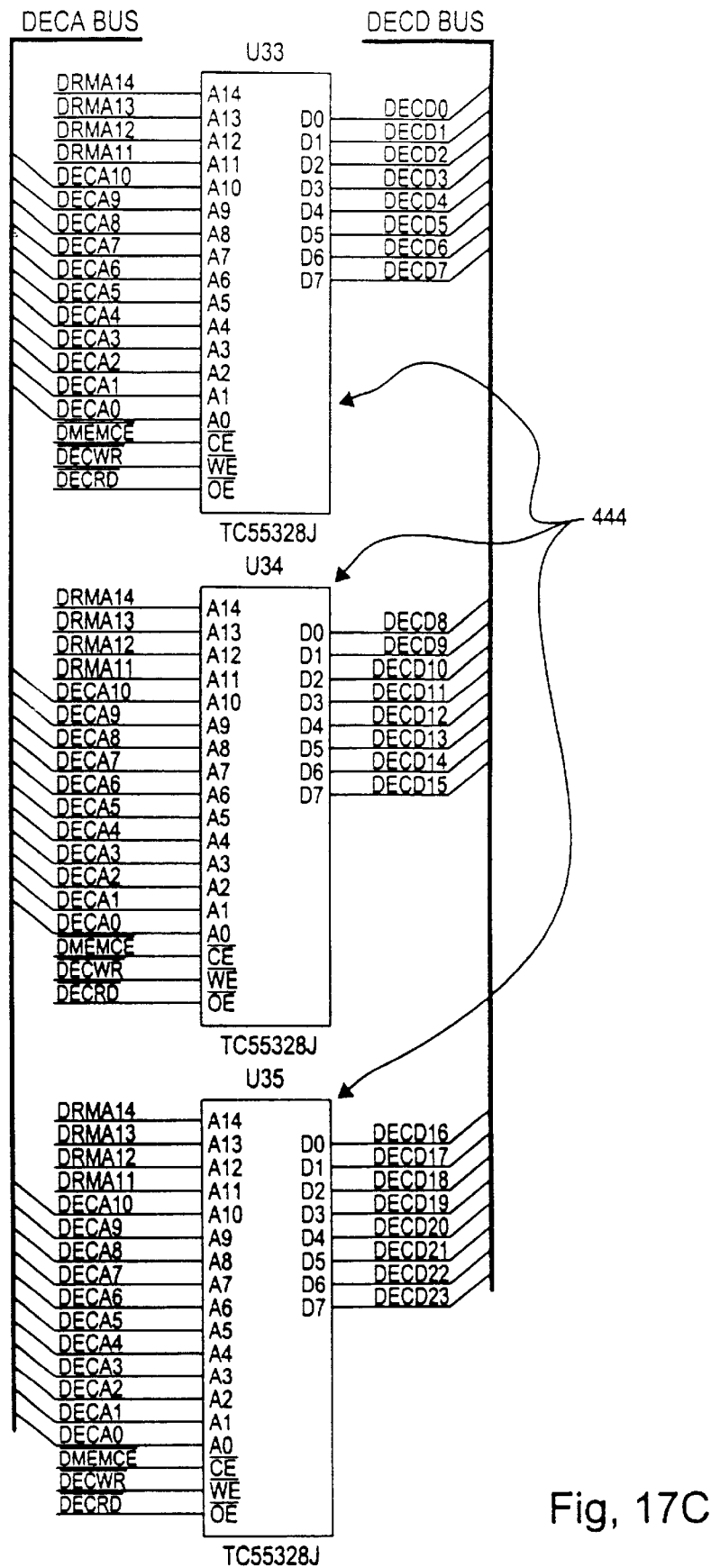

Referring now to FIGS. 7, 16 and 17, the decoder DSP 440 receives a digital input signal 422 from the modem 36 (shown in FIG. 2). The decoder DSP 440 performs the modified ISO/MPEG decompression scheme according to the software routine (described in the software appendix) stored in RAM memory 444 to produce a digital output to be sent to the digital/analog converter 442.

The D/A clock generation unit 448 is shown in FIGS. 16 and 18. The function of this circuitry is to provide all the necessary timing signals for the digital/analog converter 442 and the decoder DSP 440.

Figure 19:
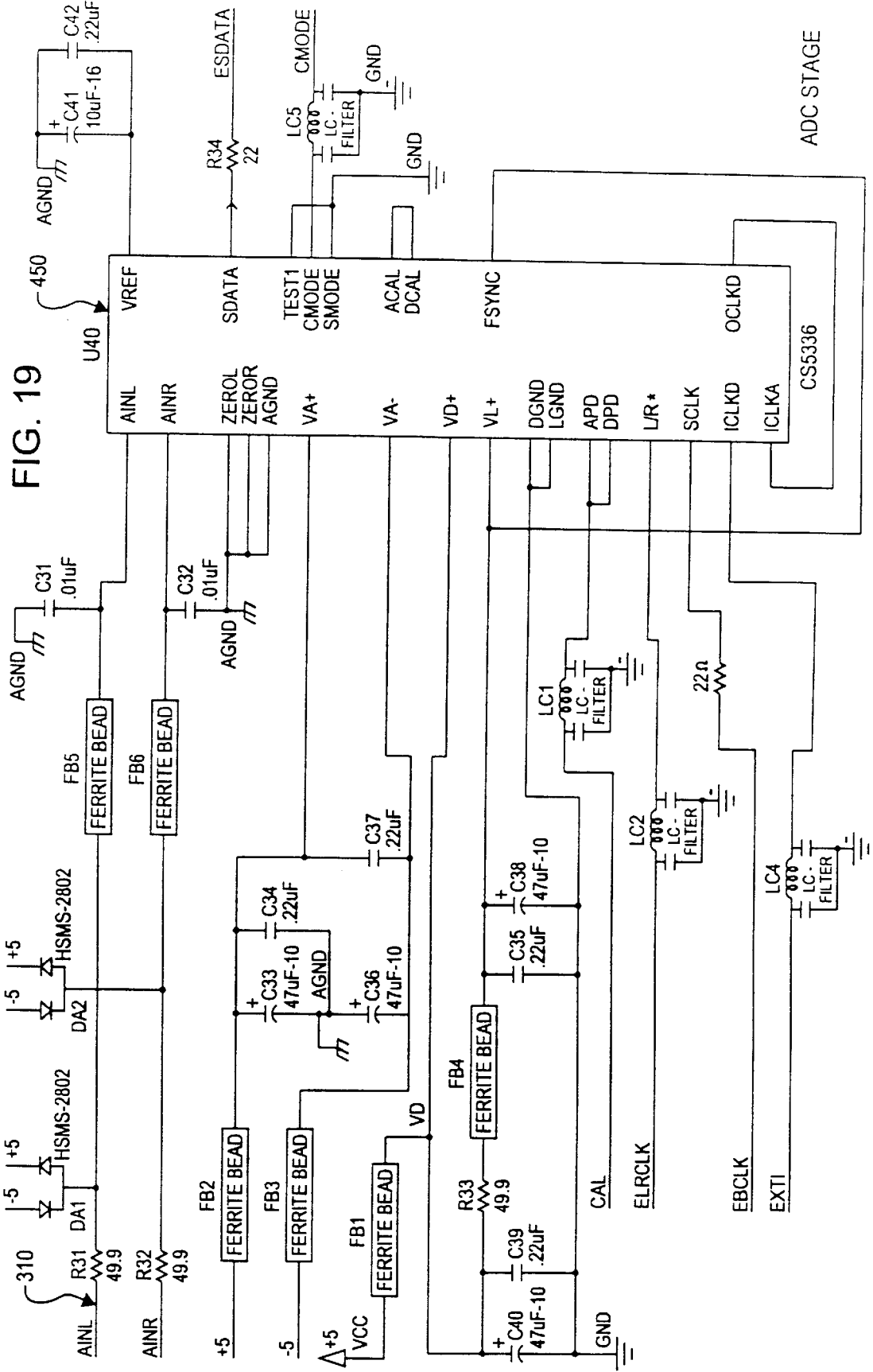
FIG. 19 is a detailed circuit diagram of the analog/digital converter portion of the encoder of FIG. 12.

The analog/digital converter 450, shown in FIGS. 12 and 19, is used to convert the analog input signal 310 into a PCM digital signal 430.

The digital/analog converter 442, shown in FIGS. 16 and 20 is used to convert the PCM digital signal from the decoder DSP 440 into an analog audio output signal 336.

The Reed-Soloman error correction decoding circuitry 446, shown in FIGS. 15 and 16, decodes a Reed-Soloman coded signal to correct errors produced during transmission of the signal through the modem 36 (shown in FIG. 2) and telephone network.

Another function contemplated by this invention is to allow real time, user operated adjustment of a number of psycho-acoustic parameters of the ISO/MPEG compression/decompression scheme used by the CODEC 12. A manner of implementing this function is described in applicant's application entitled "System For Adjusting Psycho-Acoustic Parameters In A Digital Audio Codec" which is being filed concurrently herewith (such application and related Software Appendix are hereby incorporated by reference). Also, applicants application entitled "System For Compression And Decompression Of Audio Signals Po: Digital Transmission" and related Software Appendix which are being filed concurrently herewith are hereby incorporated by reference.

This invention has been described above with reference to a preferred embodiment. Modifications and variations may become apparent to one skilled in the art upon reading and understanding this specification. It is intended to include all such modifications and alterations within the scope of the appended

What is claimed is:

1. A portable audio transmission CODEC comprising in combination:

a analog modem;

a wideband coder for coding an input audio signal into a digital signal to be transmitted through a traditional analog telephone network, the digital signal having an optional transmission rate of 28.8 kilobits per second or less; and a decoder for decoding the digital signal that is received from the telephone network to provide an output audio signal with a frequency range greater than 4 kilohertz; wherein said analog modem receives an incoming audio signal from said standard telephone line on said telephone network, said modem converting said single incoming encoded analog signal to an incoming digital encoded digital signal; and wherein said portable CODEC further comprises a decoder decoding said incoming encoded digital signal from said analog modem based on a lossy decompression routine stored in memory to provide an analog output signal.

2. A portable CODEC according to claim 1, wherein said control processor is selectable by a user between multiple modes of operation, said control processor, when in a test mode, bypassing said telephone network and directing said single encoded digital signal from said encoder directly to said decoder to allow testing of said compression and decompression routines in stored memory.

3. A portable CODEC according to claim 1, further comprising a clock generator for providing synchronized clock signals to said encoder and decoder.

4. A portable CODEC according to claim 1, wherein said decoder comprises:

memory storing an ISO/MPEG decompression routine; and a digital single processor decoding and converting said incoming encoded digital signal based on said ISO/MPEG decompression routine stored in memory to produce said analog output signal.

5. A portable CODEC according to claim 4, wherein said decoder further comprises:

a D/A converter converting a digital output of said digital signal processor to said analog telephone signal.

6. A portable CODEC according to claim 5, wherein said decoder further comprises a D/A clock generation unit generating synchronous timing signals for said D/A converter and digital signal processor.

7. A portable CODEC for transmitting high quality audio signals over a standard telephone line having a limited bandwidth and maximum transmission rate, said portable CODEC comprising:

a single portable housing;

an analog mixer, within the housing, receiving an input audio signal from at least one input line, said audio mixer amplifying and mixing input audio signals to produce a single combined audio input signal;

memory, with the housing, storing a lossy audio compression routine;

an encoder, within the housing, converting said single combined audio input signal to a combined digital input signal at a sampling rate and encoding said combined digital input signal based on said lossy compression routine stored in memory to produce a single encoded digital signal having a compression ratio with respect to said single combined audio input signal;

an analog modem, with the housing, establishing a connection with, and a transmission rate for, a standard telephone line of a telephone network, said modem converting said encoded digital signal to an encoded analog output signal and outputting said encoded analog output signal at said transmission rate established by said analog modem along the standard telephone line through the telephone network;

a processor within the housing and enabling said analog modem to output said encoded analog output signal at a transmission rate that does not exceed the maximum transmission rate of the standard telephone line;

a headphone amplifier outputting said analog output signal to a headphone output line; and a volume control controlling the volume of said analog output signal at said telephone output line.

8. A portable CODEC according to claim 7, wherein said telephone amplifier further comprises:

record and local monitor level controls receiving and adjusting levels of said single combined audio input signal from said analog mixer and of said analog output signal from said decoder, respectively; and a headphone mixer amplfier mixing output signals of said record and local monitored level controls to output a mixed record/local output signal at said headphone output line.

9. A portable CODEC according to claim 7, wherein said headphone amplifier further comprises:

a record mix controller operative by the user, receiving said combined audio signal from said analog mixer, said mix controller controlling a level of said combined audio input signal; and a record output amplifier controlled by said record mix controller outputting said combined audio input signal at a desired level to a record output.

10. A portable CODEC for transmitting high quality audio signals over a standard telephone line having a limited bandwidth and maximum transmission rate, said portable CODEC comprising:

a single portable housing;

an analog mixer, within the housing, receiving an input audio signal from at least one input line, said audio mixer amplifying and mixing input audio signals to produce a single combined audio input signal;

memory, with the housing, storing a lossy audio compression routine;

an encoder, within the housing, converting said single combined audio input signal to a combined digital input signal at a sampling rate and encoding said combined digital input signal based on said lossy compression routine stored in memory to produce a single encoded digital signal having a compression ratio with respect to said single combined audio input signal;

an analog modem, with the housing, establishing a connection with, and a transmission rate for, a standard telephone line of a telephone network, said modem converting said encoded digital signal to an encoded analog output signal and outputting said encoded analog output signal at said transmission rate established by said analog modem along the standard telephone line through the telephone network; and a processor within the housing and enabling said analog modem to output said encoded analog output signal at a transmission rate that does not exceed the maximum transmission rate of the standard telephone line, said processor also comprising: a keypad/LCD interface adapted to communication with a keypad and LCD display respectively; and a microprocessor communicating with the user through the keypad/LCD interface.

11. A portable CODEC for transmitting high quality audio signals over a standard telephone line having a limited bandwidth and maximum transmission rate, said portable CODEC comprising:

a single portable housing;

an analog mixer, within the housing, receiving an input audio signal from at least one input line, said audio mixer amplifying and mixing input audio signals to produce a single combined audio input signal;

memory, with the housing, storing a lossy audio compression routine;

an encoder, within the housing, converting said single combined audio input signal to a combined digital input signal at a sampling rate and encoding said combined digital input signal based on said lossy compression routine stored in memory to produce a single encoded digital signal having a compression ratio with respect to said single combined audio input signal;

an analog modem, with the housing, establishing a connection with, and a transmission rate for, a standard telephone line of a telephone network, said modem converting said encoded digital signal to an encoded analog output signal and outputting said encoded analog output signal at said transmission rate established by said analog modem along the standard telephone line through the telephone network;

a processor within the housing and enabling said analog modem to output said encoded analog output signal at a transmission rate that does not exceed the maximum transmission rate of the standard telephone line;

a keypad entering input commands to said processor; and a LCD display displaying responses to said input commands and displaying alert messages.

12. A portable CODEC according to claim 11, further comprising:

a programmable interval timer circuit interfacing said control processor with said keypad and LCD display.

13. A portable CODEC according to claim 12, further comprising:

a universal asynchronous receiver/transmitter providing a synchronous input/output data to said control processor from an external computer through a remote control port and a serial port in said receiver/transmitter.

14. A portable CODEC for transmitting high quality audio signals over a standard telephone line having a limited bandwidth and maximum transmission rate, said portable CODEC comprising:

a single portable housing;

an analog mixer, within the housing, receiving an input audio signal from at least one input line, said audio mixer amplifying and mixing input audio signals to produce a single combined audio input signal;

memory, with the housing, storing a lossy audio compression routine;

an encoder, within the housing, converting said single combined audio input signal to a combined digital input signal at a sampling rate and encoding said combined digital input signal based on said lossy compression routine stored in memory to produce a single encoded digital signal having a compression ratio with respect to said single combined audio input signal;

an analog modem, with the housing, establishing a connection with, and a transmission rate for, a stand telephone line of a telephone network, said modem converting said encoded digital signal to an encoded analog output signal and outputting said encoded analog output signal at said transmission rate established by said analog modem along the standard telephone line through the telephone network; and a processor within the housing and enabling said analog modem to output said encoded analog output signal at a transmission rate that does not exceed the maximum transmission rate of the standard telephone line;

said encoder further comprising: an A/D converter converting said combined audio input signal to a digital pulse code modulated signal at said predefined sampling rate; and a digital signal processor encoding said digital pulse code modulated signal based on a modified ISO/MPEG compression routine stored in said memory to produce said encoded signal.

15. A portable CODEC according to claim 14, further comprising:

an A/D clock generation unit generating timing signals for said A/D converter and digital signal processor based on said transmission rate established by said analog modem.

16. A portable CODEC comprising in combination:

a portable codec housing;

an audio input section mounted in association with the portable codec housing, whereby the audio input section can provide an input analog audio signal;

an analog modem mounted within the portable codec housing, whereby said analog modem can receive an incoming analog signal from a traditional telephone line on a traditional analog telephone network and convert said incoming analog signal to at least one incoming encoded digital signal;

a wideband audio coder section mounted within the portable transmission system housing in communication with the audio input section and the analog modem, whereby the wideband coder section may code said input analog audio signal into a digital signal to be transmitted through said analog modem to said traditional analog telephone network, the digital signal providing an available transmission rate of 28.8 kilobits per second or less;

a wideband decoder section mounted within the portable transmission system housing in communication with the analog modem and having a lossy compression routine stored on said wideband decoder section, whereby said wideband decoder section may receive the incoming encoded digital signal from said analog modem and decode the incoming encoded digital signal based on said lossy compression routine to provide an output analog audio signal with a frequency range greater than 4 kilohertz; and an audio output section mounted in association with the portable transmission system housing in communication with said wideband decoder section, whereby said audio output section may output the output analog audio signal from the portable codec housing.

* * * * *